United States Patent
Pan et al.

(10) Patent No.: US 10,948,811 B2
(45) Date of Patent: Mar. 16, 2021

(54) ILLUMINATION SYSTEM AND PROJECTION APPARATUS

(71) Applicant: Coretronic Corporation, Hsin-Chu (TW)

(72) Inventors: Haw-Woei Pan, Hsin-Chu (TW); Jo-Han Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/392,587

(22) Filed: Apr. 23, 2019

(65) Prior Publication Data
US 2019/0391470 A1   Dec. 26, 2019

(30) Foreign Application Priority Data

Jun. 25, 2018 (CN) .......................... 201810660762.2
Feb. 28, 2019 (CN) .......................... 201910150598.5

(51) Int. Cl.
*G03B 21/20* (2006.01)
*G03B 27/14* (2006.01)
(Continued)

(52) U.S. Cl.
CPC ......... *G03B 21/204* (2013.01); *G02B 5/0278* (2013.01); *G02B 27/141* (2013.01); *G03B 21/2066* (2013.01)

(58) Field of Classification Search
CPC .............. G03B 21/204; G03B 21/2066; G02B 27/141; G02B 5/0278; G02B 5/0284; G02B 27/0994; G02B 27/1026
See application file for complete search history.

(56) References Cited

U.S. PATENT DOCUMENTS

| | | |
|---|---|---|
| 6,882,379 B1 | 4/2005 | Yokoyama et al. |
| 2006/0007407 A1 | 1/2006 | Matsui |

(Continued)

FOREIGN PATENT DOCUMENTS

| | | |
|---|---|---|
| CN | 1559013 | 12/2004 |
| CN | 1987552 | 6/2007 |

(Continued)

OTHER PUBLICATIONS

"Notice of Allowance of Taiwan Counterpart Application," dated Mar. 2, 2020, p. 1-p. 4.

Primary Examiner — Michelle M Iacoletti
Assistant Examiner — Danell L Owens
(74) Attorney, Agent, or Firm — JCIPRNET

(57) ABSTRACT

An illumination system configured to provide an illumination beam and including an excitation light source and a wavelength conversion module is provided. The excitation light source is configured to emit an excited beam. The wavelength conversion module is located on a transmission path of the excited beam, and has an annular wavelength conversion region. A first part of the excited beam is incident to the annular wavelength conversion region and converted into a first color light, and a second part of the excited beam is incident to the wavelength conversion module to form a second color light. A proportional value range of the second part of the excited beam and the excited beam ranges between 5% and 30%. Moreover, a projection apparatus is also provided. The illumination system of the invention has a simple structure and a concise optical path layout.

18 Claims, 24 Drawing Sheets

(51) Int. Cl.
*G02B 5/02* (2006.01)
*G02B 27/14* (2006.01)

(56) References Cited

U.S. PATENT DOCUMENTS

| | | | |
|---|---|---|---|
| 2010/0245777 A1* | 9/2010 | Ogura | F21V 9/38 353/38 |
| 2012/0242912 A1* | 9/2012 | Kitano | H04N 9/3114 348/759 |
| 2013/0050654 A1* | 2/2013 | Hu | G03B 33/06 353/31 |
| 2013/0100644 A1* | 4/2013 | Hu | G03B 21/2066 362/84 |
| 2013/0201456 A1* | 8/2013 | Kashiwagi | G03B 21/204 353/31 |
| 2013/0242534 A1 | 9/2013 | Pettitt et al. | |
| 2013/0301237 A1* | 11/2013 | Finsterbusch | F21V 9/45 362/84 |
| 2014/0022760 A1 | 1/2014 | Hartwig | |
| 2014/0254129 A1* | 9/2014 | Miyoshi | F21V 13/08 362/84 |
| 2014/0347634 A1 | 11/2014 | Bommerbach et al. | |
| 2015/0098070 A1 | 4/2015 | Hsieh et al. | |
| 2015/0167907 A1 | 6/2015 | Hoehmann | |
| 2015/0316839 A1 | 11/2015 | Jeoung et al. | |
| 2016/0077417 A1* | 3/2016 | Ishikawa | G03B 21/2013 353/20 |
| 2017/0269464 A1 | 9/2017 | Tsai et al. | |
| 2018/0173087 A1 | 6/2018 | Hsieh et al. | |
| 2019/0196315 A1 | 6/2019 | Pan et al. | |

FOREIGN PATENT DOCUMENTS

| | | |
|---|---|---|
| CN | 101126889 | 2/2008 |
| CN | 201852981 | 6/2011 |
| CN | 102650811 | 8/2012 |
| CN | 102147561 | 11/2012 |
| CN | 102193296 | 3/2013 |
| CN | 103283046 | 9/2013 |
| CN | 103453448 | 12/2013 |
| CN | 102418907 | 4/2014 |
| CN | 102563410 | 8/2014 |
| CN | 104267567 | 1/2015 |
| CN | 102707551 | 4/2015 |
| CN | 102289141 | 7/2015 |
| CN | 204593250 | 8/2015 |
| CN | 105022212 | 11/2015 |
| CN | 105093795 | 11/2015 |
| CN | 105137610 | 12/2015 |
| CN | 105353578 | 2/2016 |
| CN | 104238248 | 7/2016 |
| CN | 104049445 | 12/2016 |
| CN | 106412535 | 2/2017 |
| EP | 2902844 | 8/2015 |
| JP | 2012159603 | 8/2012 |
| JP | 2012185369 | 9/2012 |
| JP | 2015031876 | 2/2015 |
| JP | 2015184407 | 10/2015 |
| TW | 460723 | 10/2001 |
| TW | I260923 | 8/2006 |
| TW | I370316 | 8/2012 |
| TW | I380125 | 12/2012 |
| TW | 201514603 | 4/2015 |
| TW | 201530062 | 8/2015 |
| TW | I504832 | 10/2015 |
| TW | 201546534 | 12/2015 |
| TW | I540377 | 7/2016 |
| TW | M529190 | 9/2016 |
| TW | M547687 | 8/2017 |
| TW | I605295 | 11/2017 |
| TW | 201822184 | 6/2018 |
| TW | I633383 | 8/2018 |
| WO | 2016015552 | 2/2016 |
| WO | 2018095019 | 5/2018 |

\* cited by examiner

ILLUMINATION SYSTEM AND PROJECTION APPARATUS

CROSS-REFERENCE TO RELATED APPLICATION

This application claims the priority benefits of China application serial no. 201810660762.2, filed on Jun. 25, 2018 and China application serial no. 201910150598.5, filed on Feb. 28, 2019. The entireties of the above-mentioned patent applications are hereby incorporated by reference herein and made a part of this specification.

BACKGROUND OF THE INVENTION

Field of the Invention

The invention relates to an optical system and an optical apparatus including the optical system, and particularly relates to an illumination system and a projection apparatus.

Description of Related Art

In recent years, projection apparatuses based on solid state light sources such as Light-Emitting Diodes (LEDs) and laser diodes have gradually taken a place in the market. Since the laser diode has a luminous efficiency higher than about 20%, in order to break through a light source limitation of the LED, a technique of using the laser light source to excite phosphor powder to produce a pure color light source required by a projector is gradually developed.

There is a Digital Light Processing (DLP) projector framework, in which two sets of blue light laser light sources are adopted. One set of the blue light laser light source emits a blue laser beam to irradiate a phosphor powder of a phosphor wheel and a reflection region (or a transmission region) to output yellow light and blue light, and then the yellow light is separated into red light and green light by a dichroic mirror in the projector to form two primary colors of light, and the red light and green light are guided to a subsequent light valve. Another set of the blue light laser light source provides a blue laser beam, and after the blue laser beam passes through a laser speckle removal device (such as an independent blue light diffuser or a diffusion wheel) to remove a laser speckle, the blue laser beam is guided to the subsequent light valve by subsequent optical elements. In this way, three colors of light including blue light, green light and red light are formed.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to an illumination system, which has a simple structure.

The invention is directed to a projection apparatus, which has a simple structure.

Other objects and advantages of the invention may be further illustrated by the technical features broadly embodied and described as follows.

In order to achieve one or a portion of or all of the objects or other objects, an embodiment of the invention provides an illumination system. The illumination system is configured to provide an illumination beam, and includes an excitation light source and a wavelength conversion module. The excitation light source is configured to emit an excited beam. The wavelength conversion module is located on a transmission path of the excited beam, and has an annular wavelength conversion region, and when the excited beam is transmitted to the wavelength conversion module, the excited beam forms a light spot on the wavelength conversion module, at least part of the light spot is located on the annular wavelength conversion region, and a first part of the excited beam is incident to the annular wavelength conversion region and converted into a first color light, and a second part of the excited beam is incident to the wavelength conversion module to form a second color light, where the first color light and the second color light are simultaneously emitted out of the wavelength conversion module, and the illumination beam includes the first color light and the second color light, and a proportional value range of the second part of the excited beam and the excited beam ranges between 5% and 30%.

In order to achieve one or a portion of or all of the objects or other objects, an embodiment of the invention provides a projection apparatus. The projection apparatus includes the aforementioned illumination system, a light splitting/combining unit, at least two light valves and a projection lens. The light splitting/combining unit is located on a transmission path of the illumination beam, and is configured to convert the illumination beam into a plurality of sub-illumination beams. The at least two light valves are located on a transmission path of the sub-illumination beams, and are configured to convert the sub-illumination beams into a plurality of image beams. The projection lens is located on a transmission path of the image beams, and is configured to convert the image beams into a projection beam, where the image beams are transmitted to the projection lens by the light splitting/combining unit.

Based on the above description, the embodiments of the invention have at least one of following advantages or effects. In the embodiments of the invention, the illumination system and the projection apparatus convert a part of the excited beam from one excitation light source into the first color light, and convert another part of the excited beam into the second color light based on configuration of the annular wavelength conversion region of the wavelength conversion module. In this way, the illumination system and the projection apparatus may form three colors (blue, green and red) of light in case that only one excitation light source is configured, so as to achieve a simple structure and a concise optical path layout. Moreover, since the optical path layout of the illumination system and the projection apparatus is effectively simplified, layout flexibility of other components in the system is increased. Moreover, since the illumination system and the projection apparatus are only required to configure one excitation light source, light source energy may be concentrated to one place, and design complexity of a cooling module is decreased, which avails enhancing design flexibility of a system layout.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
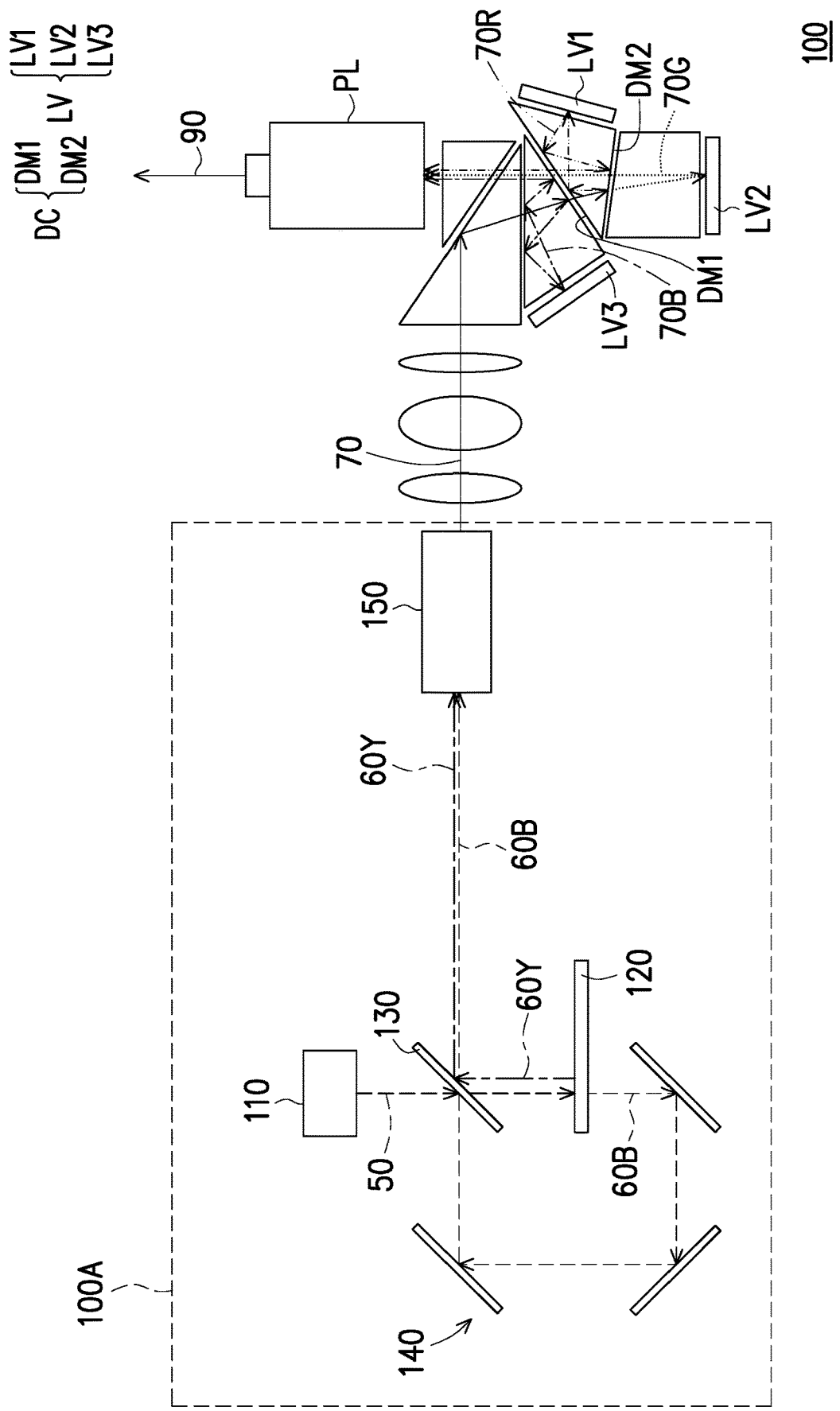
FIG. 1A is a structural schematic diagram of a projection apparatus according to an embodiment of the invention.
Figure 1B:
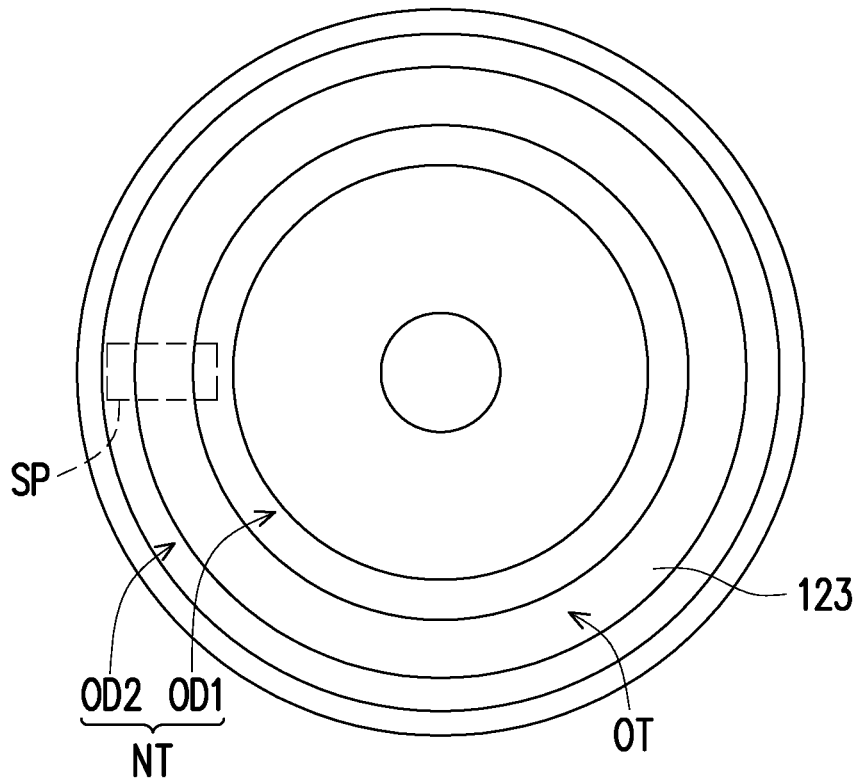
FIG. 1B is a top view of a wavelength conversion module of FIG. 1A.
Figure 1C:
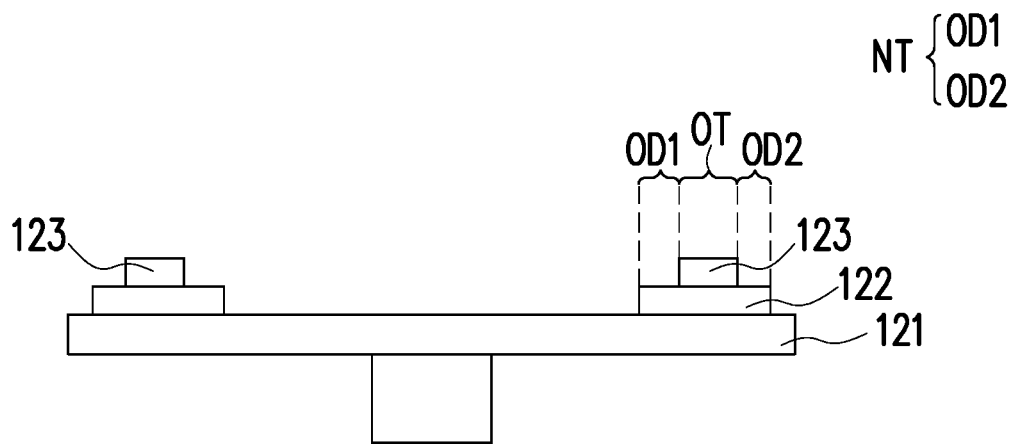
FIG. 1C is a cross-sectional view of the wavelength conversion module of FIG. 1B.

FIG. 1A is a structural schematic diagram of a projection apparatus according to an embodiment of the invention. FIG. 1B is a top view of a wavelength conversion module of FIG. 1A. FIG. 1C is a cross-sectional view of the wavelength conversion module of FIG. 1B. Referring to FIG. 1A, in the embodiment, the projection apparatus 100 includes an illumination system 100A, a light splitting/combining unit DC, at least two light valves LV and a projection lens PL. For example, in the embodiment, the number of the light valves LV is three, i.e. light valves LV1, LV2 and LV3, though the invention is not limited thereto. In the embodiment, the light valve LV is, for example, a Digital Micro-mirror Device (DMD), though the invention is not limited thereto. In other embodiments, the light valve LV may also be a Liquid-Crystal-On-Silicon (LCOS) panel, a liquid crystal panel or other beam modulator.

To be specific, as shown in FIG. 1A, the illumination system 100A is configured to provide an illumination beam 70, and includes an excitation light source 110, a wavelength conversion module 120, a first dichroic element 130 and a light transmission module 140. The excitation light source 110 is adapted to emit an excited beam 50. For example, in the embodiment, the excitation light source 110 is a blue laser light source, and the excited beam 50 is a blue laser beam. The excitation light source 110 may include a plurality of blue laser diodes (not shown) arranged in an array, though the invention is not limited thereto.

To be specific, as shown in FIG. 1A, in the embodiment, the first dichroic element 130 is disposed on a transmission path of the excited beam 50, and is located between the excitation light source 110 and the wavelength conversion module 120. To be specific, the first dichroic element 130 may be a dichroic element, a partially transmissive partially reflective element, a polarizing beam splitting element or other element adapted to splitting the beam. For example, in the embodiment, the first dichroic element 130 is, a dichroic mirror with yellow reflection, which is pervious to blue light and reflects yellow light. Therefore, the first dichroic element 130 may be pervious to the blue excited beam 50. In this way, the excited beam 50 of the excitation light source 110 may penetrate through the first dichroic element 130 and is transmitted to the wavelength conversion module 120.

Further, as shown in FIG. 1A to FIG. 1C, in the embodiment, the wavelength conversion module 120 is located on the transmission path of the excited beam 50, and has an annular wavelength conversion region OT and a non-conversion region NT. For example, as shown in FIG. 1B, in the embodiment, the annular wavelength conversion region OT may be an O-ring. Further, as shown in FIG. 1A and FIG. 1B, in the embodiment, when the excited beam 50 is transmitted to the wavelength conversion module 120, the excited beam 50 forms a light spot SP on the wavelength conversion module 120. Then, a first part of the excited beam 50 is incident to the annular wavelength conversion region OT, so that at least part of the light spot SP is located on the annular wavelength conversion region OT, and the first part of the excited beam 50 is converted into a first color light 60Y; a second part of the excited beam 50 is incident to the non-conversion region NT of the wavelength conversion module 120, such that at least part of the light spot SP is located on the non-conversion region NT, and the second part of the excited beam 50 forms a second color light 60B. For example, a proportional value range of the second part of the excited beam 50 and the excited beam 50 ranges between 5% and 30%. It should be noted that the above value range is only used as an example, and is not used for limiting the invention.

Conversion processes of the first color light 60Y and the second color light 60B are further described below.

For example, as shown in FIG. 1B and FIG. 1C, in the embodiment, the wavelength conversion module 120 includes a substrate 121, an annular diffusion layer 122 and an annular wavelength conversion layer 123. In the embodiment, the substrate 121 is a transparent substrate, for example. In the embodiment, the annular wavelength conversion layer 123 is located on the substrate 121, and is disposed corresponding to the wavelength conversion region OT. For example, in the embodiment, the wavelength conversion module 120 is, for example, a phosphor wheel, and a material of the annular wavelength conversion layer 123 includes a phosphor powder adapted to excite a yellow beam, so as to convert the excited beam 50 into the yellow beam. In other words, in the embodiment, the first color light 60Y converted by the wavelength conversion region OT from the excited beam 50 is the yellow light. For example, in the embodiment, the first color light 60Y is a wide spectrum color light, and a main wavelength difference between a main wavelength thereof and the excited beam 50 (i.e. a main wavelength of the first color light 60Y minus a main wavelength of the excited beam 50) is greater than or equal to 20 nm. It should be noted that the above value range is only an example, and is not used for limiting the invention.

On the other hand, as shown in FIG. 1C, the annular diffusion layer 122 is located on the substrate 121, and the annular diffusion layer 122 is located between the substrate 121 and the annular wavelength conversion layer 123. On the other hand, as shown in FIG. 1B and FIG. 1C, the annular wavelength conversion layer 123 does not completely cover the annular diffusion layer 122, and the part of the annular diffusion layer 122 that is not covered by the annular wavelength conversion layer 123 form a first annular diffusion region OD1 and a second annular diffusion region OD2 on the substrate 121. Namely, as shown in FIG. 1B, the first annular diffusion region OD1 and the second annular diffusion region OD2 are located on the substrate 121, and the annular wavelength conversion layer 123 corresponding to the wavelength conversion region OT is located between the first annular diffusion region OD1 and the second annular diffusion region OD2. Moreover, the annular wavelength conversion layer 123 surrounds the first annular diffusion region OD1 and is surrounded by the second annular diffusion region OD2.

Further, as shown in FIG. 1B, in the embodiment, the first annular diffusion region OD1 and the second annular diffusion region OD2 correspond to the non-conversion region NT of the wavelength conversion module 120. Since the first annular diffusion region OD1 and the second annular diffusion region OD2 may destroy coherence of laser beam to have a laser speckle elimination function, therefore blue light is produced, and a laser speckle phenomenon is eliminated when the excited beam 50 passes through the first annular diffusion region OD1 and the second annular diffusion region OD2. In other words, in the embodiment, the second color light 60B formed through the non-conversion region NT has the same color with that of the excited beam 50, i.e. the blue light.

To be specific, as shown in FIG. 1A, in the embodiment, since the excited beam 50 may simultaneously pass through the annular wavelength conversion region OT and the non-conversion region NT of the wavelength conversion module 120, the first color light 60Y and the second color light 60B may be simultaneously emitted out of the wavelength conversion module 120. Then, as shown in FIG. 1A, in the embodiment, the wavelength conversion module 120 reflects the first color light 60Y back to the first dichroic element 130, and the second color light 60B is transmitted to the light transmission module 140 after passing through the wavelength conversion module 120.

To be specific, as shown in FIG. 1A, in the embodiment, the light transmission module 140 is located on a transmission path of the second color light 60B, and is configured to transmit the second color light 60B emitted from the wavelength conversion module 120 to the first dichroic element 130. For example, in the embodiment, the light transmission module 140 may include a plurality of reflecting elements (unnumbered) to transmit the second color light 60B back to the first dichroic element 130, though the invention is not limited thereto.

Then, as shown in FIG. 1A, in the embodiment, the illumination system 100A further includes a light uniforming element 150 located on a transmission path of the first color light 60Y and the second color light 60B. When the first color light 60Y and the second color light 60B are transmitted to the first dichroic element 130, since the first dichroic element 130 may reflect yellow light and is pervious to the blue light, the second color light 60B may penetrate through the first dichroic element 130, and the first color light 60Y is reflected by the first dichroic element 130, and then the light uniforming element 150 receives the first color light 60Y and the second color light 60B from the first dichroic element 130. In the embodiment, the light uniforming element 150 is, for example, an integration rod, though the invention is not limited thereto. Therefore, when the first color light 60Y and the second color light 60B from the wavelength conversion module 120 are transmitted to the light uniforming element 150, the light uniforming element 150 may uniform the first color light 60Y and the second color light 60B to form an illumination beam 70, and transmit the same to the light valve LV.

Then, as shown in FIG. 1A, in the embodiment, the light splitting/combining unit DC is located on a transmission path of the illumination beam 70, and is configured to convert the illumination beam 70 into a plurality of sub-illumination beams 70R, 70G, 70B. For example, as shown in FIG. 1A, the light splitting/combining unit DC may include a plurality of dichroic mirrors DM1, DM2, and when the illumination beam 70 passes through the different dichroic mirrors DM1, DM2, the illumination beam 70 is sequentially converted into the sub-illumination beams 70R, 70G, 70B for transmitting to the subsequent corresponding light valves LV, i.e. the light valves LV1, LV2 and LV3.

To be specific, as shown in FIG. 1A, in the embodiment, the light valves LV1, LV2, LV3 are respectively located on transmission paths of the sub-illumination beams 70R, 70G, 70B, and are used for converting the sub-illumination beams 70R, 70G, 70B into a plurality of image beams 80R, 80G, 80B. Moreover, the projection lens PL is located on a transmission path of the image beams 80R, 80G, 80B, and is adapted to convert the image beams 80R, 80G, 80B into one projection beam 90, and projects it to a screen (not shown) to form an image. For example, since each of the sub-illumination beams 70R, 70G, 70B are respectively converged to the corresponding light valves LV1, LV2, LV3, the light valves LV1, LV2, LV3 may convert the corresponding sub-illumination beams 70R, 70G, 70B into the image beams 80R, 80G, 80B of different colors, and the image beams 80R, 80G, 80B from the light valves LV1, LV2, LV3 may be respectively transmitted to the projection lens PL through the light splitting/combining unit DC. Therefore, the projected image may be a color image.

Figure 1D:
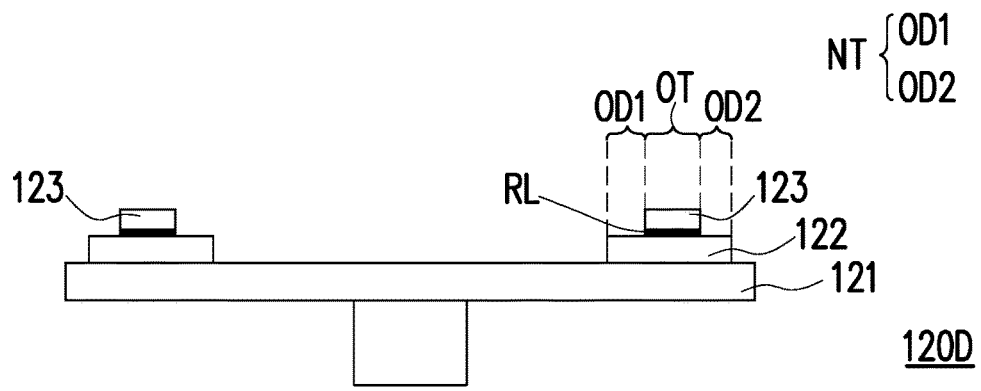
FIG. 1D is a cross-sectional view of another wavelength conversion module of FIG. 1A.
Figure 1E:
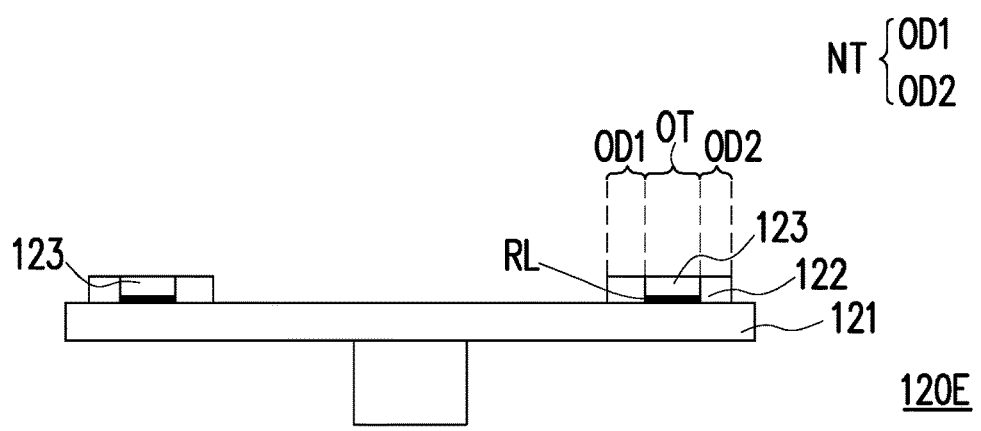
FIG. 1E is a cross-sectional view of another wavelength conversion module of FIG. 1A.
Figure 1F:
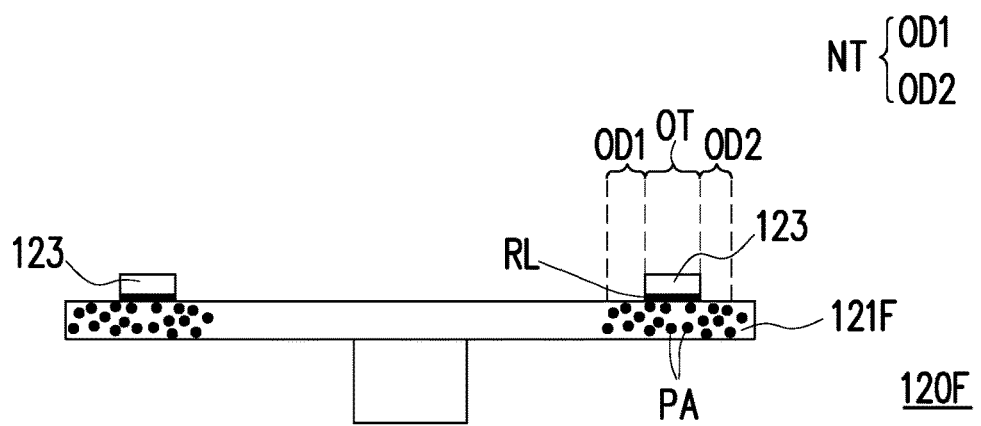
FIG. 1F is a cross-sectional view of another wavelength conversion module of FIG. 1A.

In this way, based on configuration of the annular wavelength conversion region OT, the illumination system 100A and the projection apparatus 100 may convert a part of the excited beam 60 from one excitation light source 110 into the first color light 60Y and convert the other part thereof into the second color light 60B. In this way, the illumination system 100A and the projection apparatus 100 may form three colors (i.e. blue, green and red) of light in case that only one excitation light source 110 is configured, so as to achieve a simple structure and a concise optical path layout. Moreover, since the optical layout of the illumination system 100A and the projection apparatus 100 may be effectively simplified, layout flexibility of other components in the system may be improved. Moreover, since the illumination system 100A and the projection apparatus 100 are only required to configure one excitation light source 110, the light source energy may be concentrated in one place, and design complexity of a cooling module is decreased, which avails improving design flexibility of the system layout. Moreover, since the wavelength conversion module 120 of the illumination system 100A and the projection apparatus 100 also has the light diffusion function, it is unnecessary to additionally configure a light diffusing element used for eliminating the laser speckle, so as to reduce usage of optical components to achieve cost saving and form the simple system structure. Additionally, in the other embodiment, a reflection layer is disposed between the annular wavelength conversion layer 123 and the substrate 121, such that the first color light 60Y may be effectively reflected back to the first dichroic element 130 by the wavelength conversion module 120. More descriptions are below. FIG. 1D is a cross-sectional view of another wavelength conversion module of FIG. 1A. In the embodiment, the wavelength conversion module 120D of FIG. 1D is similar to the wavelength conversion module 120 of FIG. 1B, and differences there between are as follows. Referring to FIG. 1D, the wavelength conversion module 120D also includes a reflection layer RL. The reflection layer RL is disposed between the annular wavelength conversion layer 123 and the substrate 121. Therefore, after the first part of the excited beam 50 converting into the first color light 60Y, the first color light 60Y may be effectively reflected back to the first dichroic element 130 by the reflection layer RL. The reflection layer RL is made by coating method. On the other hand, the second part of the excited beam 50 is formed to the second color light 60B. The second color light 60B may pass through the first annular diffusion region OD1 and the second annular diffusion region OD2 of the annular diffusion layer 122 and the substrate 121, and then transmits to other optical elements. FIG. 1E is a cross-sectional view of another wavelength conversion module of FIG. 1A. In the embodiment, the wavelength conversion module 120E of FIG. 1E is similar to the wavelength conversion module 120D of FIG. 1D, and differences there between are as follows. Referring to FIG. 1E, in the embodiment, the annular wavelength conversion layer 123 of the wavelength conversion module 120E does not cover to the annular diffusion layer 122. The annular wavelength conversion layer 123 is disposed between the first annular diffusion region OD1 and the second annular diffusion region OD2. On the other hand, the annular wavelength conversion layer 123 of the wavelength conversion module 120E is formed between the first annular diffusion region OD1 and the second annular diffusion region OD2 in a radial direction from a center of the substrate 121 to the edge of the substrate 121. The reflection layer RL is disposed between the annular wavelength conversion layer 123 and the substrate 121. Therefore, according to an arrangement of the reflection layer RL, after the first part of the excited beam 50 converting into the first color light 60Y, the first color light 60Y may be effectively reflected back to the first dichroic element 130 by the reflection layer RL. On the other hand, the second part of the excited beam 50 is formed to the second color light 60B. The second color light 60B may pass through the first annular diffusion region OD1 and the second annular diffusion region OD2 of the annular diffusion layer 122 and the substrate 121, and then transmits to other optical elements. FIG. 1F is a cross-sectional view of another wavelength conversion module of FIG. 1A. In the embodiment, the wavelength conversion module 120F of FIG. 1F is similar to the wavelength conversion module 120D of FIG. 1D, and differences there between are as follows. Referring to FIG. 1F, the wavelength conversion module 120F does not include the annular diffusion layer 122. Particles PA are doped in the substrate 121F to form the first annular diffusion region OD1 and the second annular diffusion region OD2 of the wavelength conversion module 120F around area of the annular wavelength conversion layer 123 in the substrate 121F. In other words, in FIG. 1F, the first annular diffusion region OD1 and the second annular diffusion region OD2 are formed by the substrate 121F. The annular wavelength conversion layer 123 surrounds the first annular diffusion region OD1 and is surrounded by the second annular diffusion region OD2. Therefore, according to an arrangement of the reflection layer RL, after the first part of the excited beam 50 converting into the first color light 60Y, the first color light 60Y may be effectively reflected back to the first dichroic element 130 by the reflection layer RL. On the other hand, the second part of the excited beam 50 is formed to the second color light 60B. The second color light 60B may pass through the substrate 121F and the first annular diffusion region OD1 and the second annular diffusion region OD2 formed by the substrate 121F with particles PA, and then transmits to other optical elements. In the abovementioned embodiments, the wavelength conversion module 120D, 120E and 120F are similar to the wavelength conversion module 120 of FIG. 1B, and all can achieve the same function. Therefore, the wavelength conversion module 120D, 120E and 120F have the same advantages. When one of the wavelength conversion module 120D, 120E and 120F is applied in the illumination system 100A and the projection apparatus 100, the illumination system 100A and the projection apparatus 100 can achieve the same advantages.

Figure 2A:
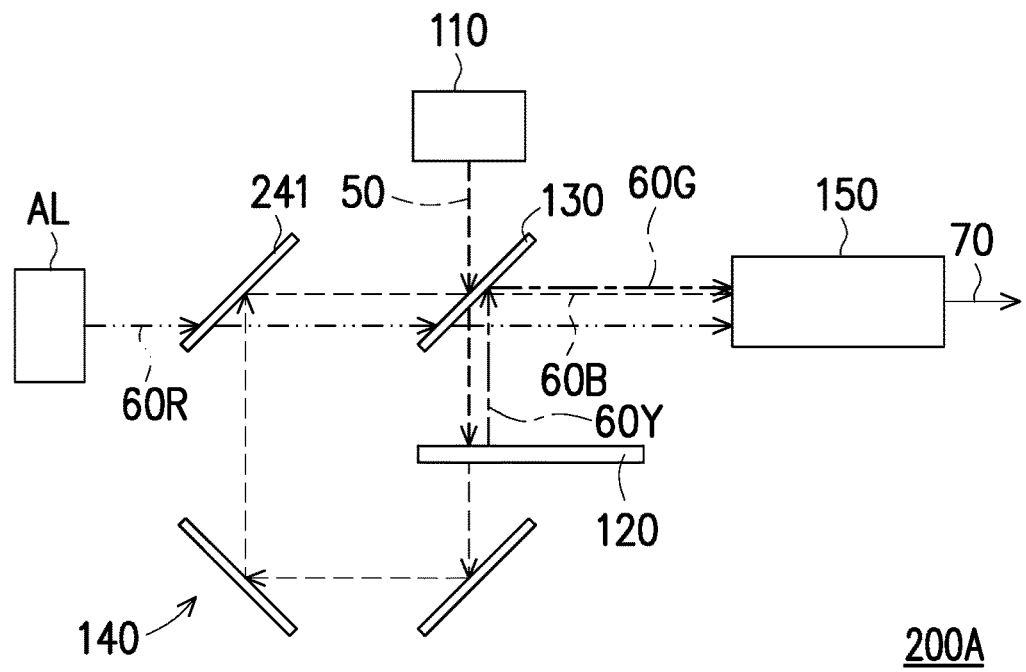
FIG. 2A to FIG. 3C are structural schematic diagrams of various illumination systems of FIG. 1A.

FIG. 2A is a structural schematic diagram of another illumination system of FIG. 1A. The illumination system 200A of FIG. 2A is similar to the illumination system 100A of FIG. 1A, and differences there between are as follows. In the embodiment, the illumination system 200A further includes an auxiliary light source AL. The auxiliary light source AL is configured to emit an auxiliary beam 60R, where a waveband of the auxiliary beam 60R is at least partially overlapped with a waveband of the first color light 60Y. For example, in the embodiment, the auxiliary light source AL is, for example, a red laser light source or a red LED light source, and the auxiliary beam 60R is red light.

To be specific, as shown in FIG. 2A, in the embodiment, the first dichroic element 130 is, for example, a dichroic mirror (DMGO) with a green orange light reflection function, which is pervious to blue light and red light, and reflects the green orange light. Moreover, the light transmission module 140 of the illumination system 200A includes a second dichroic element 241 located on the transmission path of the second color light 60B and the auxiliary beam 60R. In the embodiment, the second dichroic element 241 is, for example, dichroic mirror (DMB) with a blue light reflection function, which is pervious to red light, and reflects blue light.

In this way, the excited beam 50 of the excitation light source 110 may still be transmitted to the wavelength conversion module 120 by penetrating through the first dichroic element 130. On the other hand, the auxiliary beam 60R of the auxiliary light source AL may be transmitted to the first dichroic element 130 by penetrating through the second dichroic element 241, and the second color light 60B may still be transmitted to the first dichroic element 130 through the light transmission module 140. When the first color light 60Y from the wavelength conversion module 120 and the second color light 60B and the auxiliary beam 60R from the light transmission module 140 are all transmitted to the first dichroic element 130, the first dichroic element 130 may be pervious to the second color light 60B and the auxiliary beam 60R, and reflects a partial first color light 60G, and guides the auxiliary beam 60R, the partial first color light 60G and the second color light 60B to the light uniforming element 150. In the embodiment, a part of the first color light 60Y (yellow light) is reflected by the first dichroic element 130 to form the partial first color light 60G, which is, for example, green light. Therefore, the auxiliary beam 60R, the partial first color light 60G and the second color light 60B are combined into the illumination beam 70 after passing through the first dichroic element 130 and the second dichroic element 241.

In this way, by configuring the auxiliary light source AL in the illumination system 200A, a proportion of the red light in the illumination beam 70 is increased, so as to improve a red color performance of the projected image. Moreover, in the embodiment, since the illumination system 200A and the illumination system 100A of FIG. 1A have the same structure in the wavelength conversion module 120, the illumination system 200A may achieve effects and advantages similar to that of the aforementioned illumination system 100A, and detail thereof is not repeated. Moreover, when the illumination system 200A is applied to the aforementioned projection apparatus 100, the projection apparatus 100 may also achieve the similar effects and advantages, and detail thereof is not repeated.

Figure 2B:
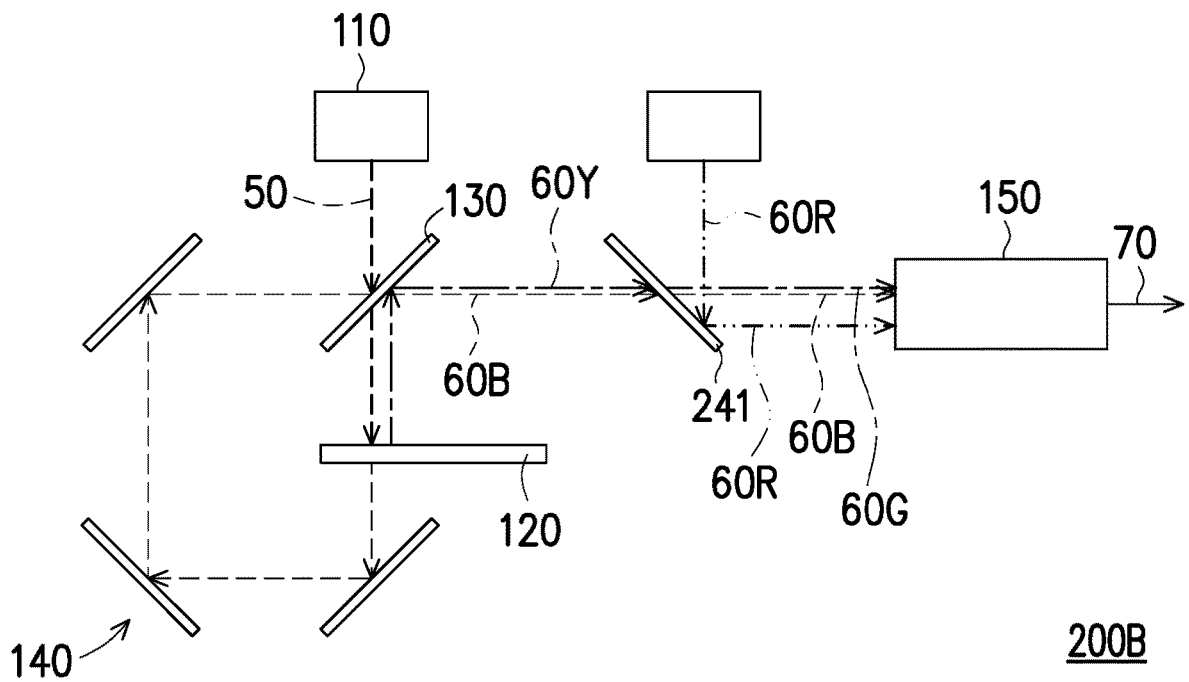

FIG. 2B is a structural schematic diagram of another illumination system of FIG. 1A. The illumination system 200B of FIG. 2B is similar to the illumination system 200A of FIG. 2A, and differences there between are as follows. In the embodiment, the first dichroic element 130 is, for example, a dichroic mirror (DMY) with a yellow light reflection function, and the second dichroic element 241 is located on transmission paths of the auxiliary beam 60R and the first color light 60Y and the second color light 60B from the first dichroic element 130. Moreover, in the embodiment, the second dichroic element 241 is, for example, a dichroic mirror (DMR) with a red light reflection function, which is pervious to blue light and green light, and reflects the red light.

In this way, when the first color light 60Y, the second color light 60B and the auxiliary beam 60R are transmitted to the second dichroic element 241, the second dichroic element 241 may be pervious to the partial first color light 60G and the second color light 60B from the first dichroic element 130, and reflects the auxiliary beam 60R from the auxiliary light source AL to guide the auxiliary beam 60R, the partial first color light 60G and the second color light 60B to the light uniforming element 150. Therefore, the auxiliary beam 60R, the partial first color light 60G and the second color beam 60B may be combined into the illumination beam 70 after passing through the first dichroic element 130 and the second dichroic element 241.

In this way, by configuring the auxiliary light source AL in the illumination system 200B, a proportion of the red light in the illumination beam 70 is increased, so as to improve the red color performance of the projected image. Moreover, in the embodiment, since the illumination system 200B and the illumination system 100A of FIG. 1A have the same structure in the wavelength conversion module 120, the illumination system 200B may achieve similar effects and advantages with that of the aforementioned illumination system 100A, and detail thereof is not repeated. Moreover, when the illumination system 200B is applied to the aforementioned projection apparatus 100, the projection apparatus 100 may also achieve the similar effects and advantages, and detail thereof is not repeated.

Figure 3A:
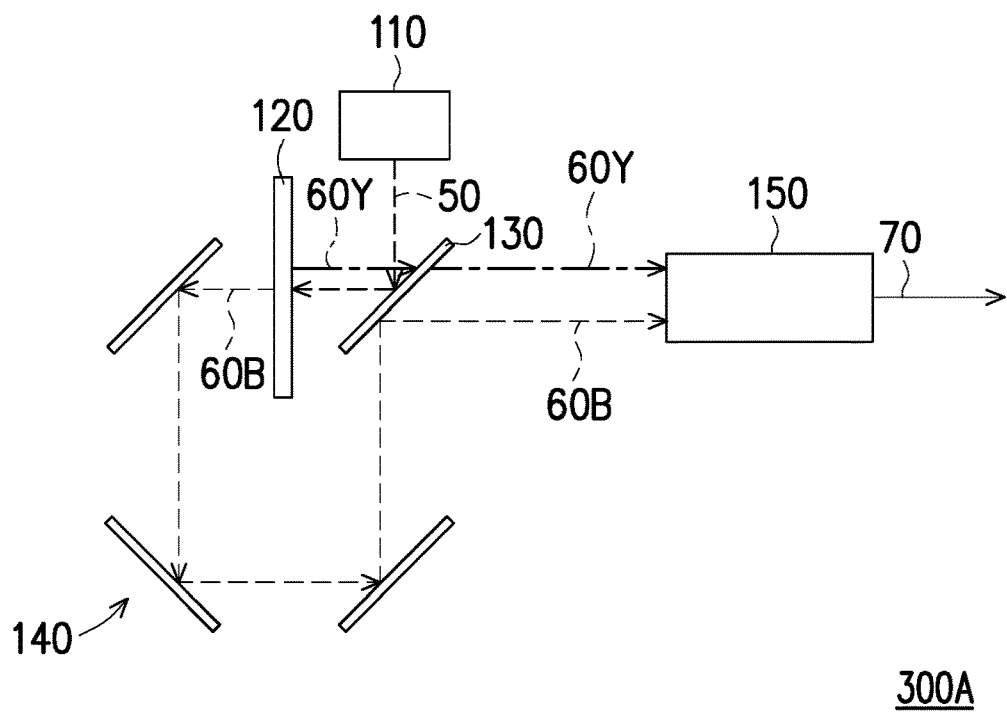

FIG. 3A is a structural schematic diagram of another illumination system of FIG. 1A. The illumination system 300A of FIG. 3A is similar to the illumination system 100A of FIG. 1A, and differences there between are as follows. In the embodiment, the first dichroic element 130 is, for example, a dichroic mirror (DMB) having a blue light reflection function, which is pervious to yellow light, and reflects blue light. Therefore, as shown in FIG. 3A, the first dichroic element 130 may reflect the blue excited beam 50, and the wavelength conversion module 120 may be disposed on a transmission path of the excited beam 50 reflected by the first dichroic element 130. In this way, the excited beam 50 from the excitation light source 110 may be transmitted to the wavelength conversion module 120 through the first dichroic element 130.

On the other hand, as shown in FIG. 3A, when the first color light 60Y and the second color light 60B are again transmitted to the first dichroic element 130, since the first dichroic element 130 may reflect the blue light and is pervious to the yellow light, the first color light 60Y may penetrate through the first dichroic element 130, and after the second color light 60B is reflected by the light transmission module 140 and the first dichroic element 130, the first color light 60Y and the second color light 60B are all transmitted to the light uniforming element 150 to form the illumination beam 70.

In the embodiment, since the illumination system 300A and the illumination system 100A of FIG. 1A have the same structure in the wavelength conversion module 120, the illumination system 300A may achieve similar effects and advantages with that of the aforementioned illumination system 100A, and detail thereof is not repeated. Moreover, when the illumination system 300A is applied to the aforementioned projection apparatus 100, the projection apparatus 100 may also achieve the similar effects and advantages, and detail thereof is not repeated.

Figure 3B:
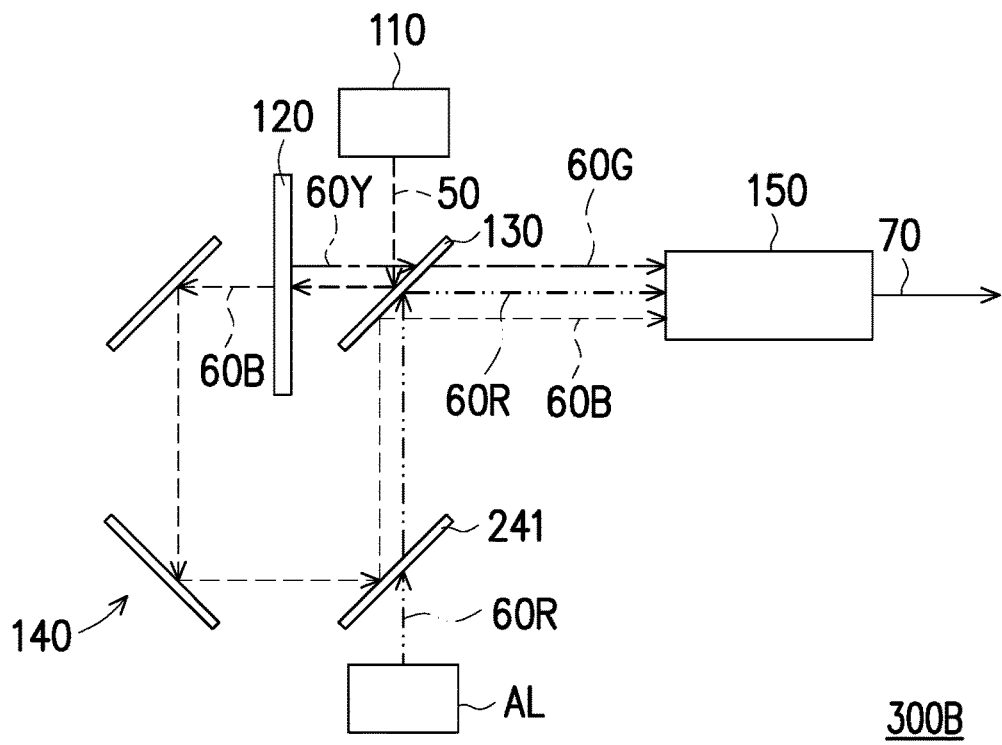

FIG. 3B is a structural schematic diagram of another illumination system of FIG. 1A. The illumination system 300B of FIG. 3B is similar to the illumination system 300A of FIG. 3A, and differences there between are as follows. In the embodiment, the illumination system 300B further includes an auxiliary light source AL. The auxiliary light source AL is configured to emit an auxiliary beam 60R, and a waveband of the auxiliary beam 60R is at least partially overlapped with a waveband of the first color light 60Y. For example, in the embodiment, the auxiliary beam 60R is red light.

To be specific, as shown in FIG. 3B, in the embodiment, the first dichroic element 130 is, for example, a dichroic mirror (DMBR) with a red light and blue light reflection function, which is pervious to green light and reflects blue light and red light. Moreover, the light transmission module 140 of the illumination system 300B includes a second dichroic element 241, where the second dichroic element 241 is located on a transmission path of the second color light 60B and the auxiliary beam 60R. In the embodiment, the second dichroic element 241 is, for example, a dichroic mirror (DMB) with a blue light reflection function, which is pervious to red light and reflects blue light.

Therefore, the excited beam 50 from the excitation light source 110 may still be transmitted to the wavelength conversion module 120 through reflection of the first dichroic element 130. On the other hand, the auxiliary beam 60R of the auxiliary light source AL may be transmitted to the first dichroic element 130 by penetrating through the second dichroic element 241, and the second color light 60B may still be reflected to the first dichroic element 130 by the light transmission module 140. When the first color light 60Y from the wavelength conversion module 120 and the second color light 60B and the auxiliary beam 60R from the light transmission module 140 are all transmitted to the first dichroic element 130, the first dichroic element 130 may be pervious to the partial first color light 60G, and reflects the second color light 60B and the auxiliary beam 60R, and guides the auxiliary beam 60R, the partial first color light 60G and the second color light 60B to the light uniforming element 150. Therefore, the auxiliary beam 60R, the partial first color light 60G and the second color light 60B are combined after passing through the first dichroic element 130 and the second dichroic element 241, and are uniformed by the light uniforming element 150 to form the illumination beam 70.

In this way, by configuring the auxiliary light source AL in the illumination system 300B, a proportion of the red light in the illumination beam 70 is increased, so as to improve a red color performance of the projected image. Moreover, in the embodiment, since the illumination system 300B and the illumination system 100A of FIG. 1A have the same structure in the wavelength conversion module 120, the illumination system 300B may achieve effects and advantages similar to that of the aforementioned illumination system 100A, and detail thereof is not repeated. Moreover, when the illumination system 300B is applied to the aforementioned projection apparatus 100, the projection apparatus 100 may also achieve the similar effects and advantages, and detail thereof is not repeated.

Figure 3C:
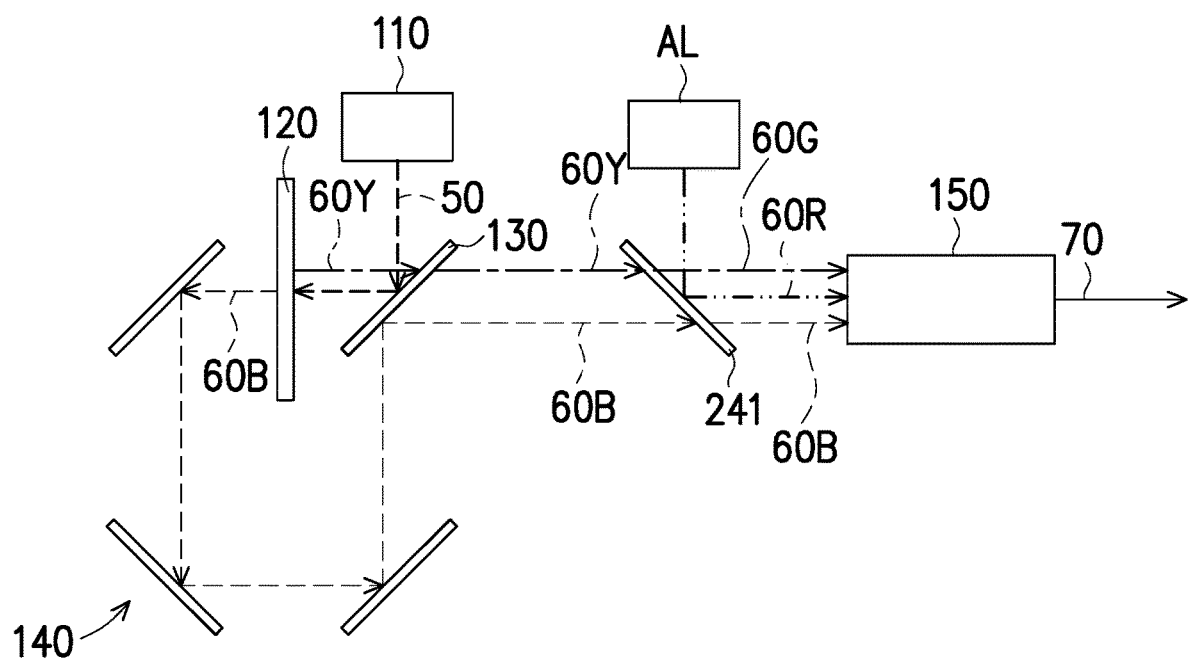

FIG. 3C is a structural schematic diagram of another illumination system of FIG. 1A. The illumination system 300C of FIG. 3C is similar to the illumination system 300B of FIG. 3B, and differences there between are as follows. In the embodiment, the first dichroic element 130 is, for example, a dichroic mirror (DMB) with a blue light reflection function, which is pervious to yellow light and reflects blue light, and the second dichroic element 241 is located on the transmission path of the auxiliary beam 60R and the first color light 60Y and the second color light 60B from the first dichroic element 130. Moreover, in the embodiment, the second dichroic element 241 is, for example, a dichroic mirror (DMR) having a red light reflection function, which is pervious to blue light and green light, and reflects red light.

Therefore, when the first color light 60Y, the second color light 60B and the auxiliary beam 60R are transmitted to the second dichroic element 241, the second dichroic element 241 may be pervious to the partial first color light 60G and the second color light 60B from the first dichroic element 130, and reflects the auxiliary beam 60R from the auxiliary light source AL, so as to guide the auxiliary beam 60R, the partial first color light 60G and the second color light 60B to the light uniforming element 150. Therefore, the auxiliary beam 60R, the partial first color light 60G and the second color light 60B are combined after passing through the first dichroic element 130 and the second dichroic element 241, and are uniformed by the light uniforming element 150 to form the illumination beam 70.

In this way, by configuring the auxiliary light source AL in the illumination system 300C, a proportion of the red light in the illumination beam 70 is increased, so as to improve a red color performance of the projected image. Moreover, in the embodiment, since the illumination system 300C and the illumination system 100A of FIG. 1A have the same structure in the wavelength conversion module 120, the illumination system 300C may achieve effects and advantages similar to that of the aforementioned illumination system 100A, and detail thereof is not repeated. Moreover, when the illumination system 300C is applied to the aforementioned projection apparatus 100, the projection apparatus 100 may also achieve the similar effects and advantages, and detail thereof is not repeated.

Figure 4A:
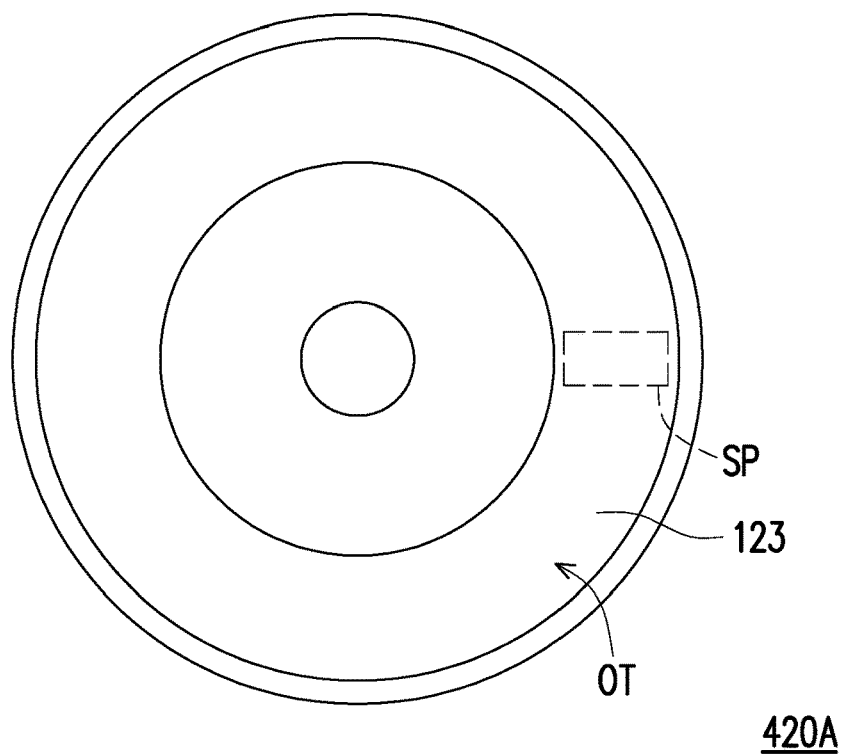
FIG. 4A is a top view of another wavelength conversion module of FIG. 1A.
Figure 4B:
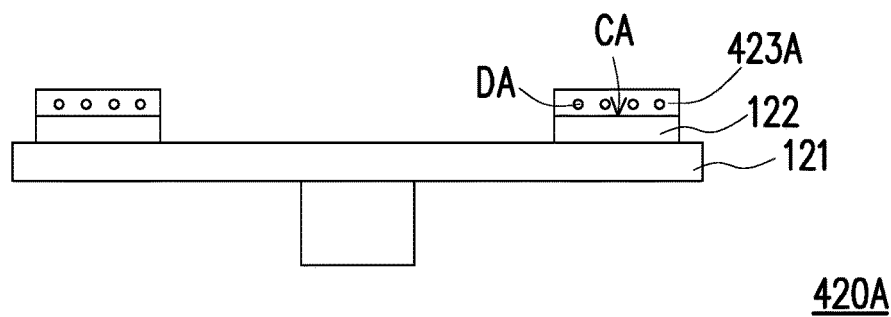
FIG. 4B is a cross-sectional view of the wavelength conversion module of FIG. 4A.

FIG. 4A is a top view of another wavelength conversion module of FIG. 1A. FIG. 4B is a cross-sectional view of the wavelength conversion module of FIG. 4A. The wavelength conversion module 420A of FIG. 4A is similar to the wavelength conversion module 120 of FIG. 1B, and differences there between are as follows. In the embodiment, the annular wavelength conversion layer 423A of the wavelength conversion module 420A may have a plurality of dot-like microstructures DA, and is adapted to convert a part of the excited beam 50 from the excitation light source 110 into the first color light 60Y.

For example, as shown in FIG. 4B, the dot-like microstructures DA of the annular wavelength conversion layer 423A may be composed of a wavelength conversion material, and the dot-like microstructures DA have cavities CA there between without configuring the wavelength conversion material, and when the part of the excited beam 50 is incident to the dot-like microstructures DA, the part of the excited beam 50 is converted into the first color light 60Y. The cavities CA correspond to the non-conversion region NT of the wavelength conversion module 420A, and when another part of the excited beam 50 passes through the non-conversion region NT (the cavities CA), the second color light 60B is emitted through the substrate 121 of the non-conversion region NT or the annular diffusion layer 122.

Therefore, by configuring the annular wavelength conversion region OT in the wavelength conversion module 420A, a first part of the excited beam 50 from one excitation light source 110 is converted into the first color light 60Y, and a second part of the excited beam 50 forms the second color light 60B. For example, in the embodiment, a proportional value range of the second part of the excited beam 50 and the excited beam 50 ranges between 5% and 30%. It should be noted that the above value range is only used as an example, and is not used for limiting the invention.

Therefore, in the embodiment, the wavelength conversion module 420A is similar to the wavelength conversion module 120 of FIG. 1B, so as to achieve a same function, and the wavelength conversion module 420A may achieve effects and advantages similar to that of the aforementioned wavelength conversion module 120, and detail thereof is not repeated. Moreover, when the wavelength conversion module 420A is applied to the aforementioned illumination systems 100A, 200A, 200B, 300A, 300B, 300C and the projection apparatus 100, the illumination systems 100A, 200A, 200B, 300A, 300B, 300C and the projection apparatus 100 may achieve the similar effects and advantages, and details thereof are not repeated.

Figure 4C:
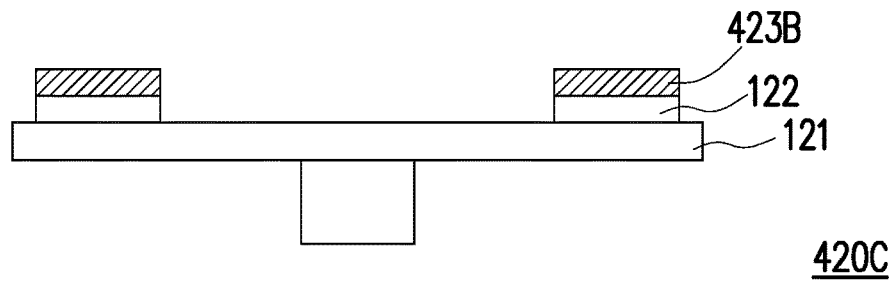
FIG. 4C is a cross-sectional view of another wavelength conversion module of FIG. 1A.

FIG. 4C is a cross-sectional view of another wavelength conversion module of FIG. 1A. The wavelength conversion module 420C of FIG. 4C is similar to the wavelength conversion module 120 of FIG. 4A, and differences there between are as follows. In the embodiment, when the annular wavelength conversion layer 423C satisfies a light absorbing condition, the second part of the excited beam 50 forms the second color light 60B after passing through the annular wavelength conversion layer 423C, where the light absorbing condition is that a volume concentration of a wavelength conversion material in the annular wavelength conversion layer 423C ranges between 30% and 85%, or a thickness of the annular wavelength conversion layer 423C ranges between 0.03 mm and 0.3 mm. It should be noted that the above value ranges are only used as an example, and are not used for limiting the invention.

Therefore, by configuring the annular wavelength conversion region OT in the wavelength conversion module 420C, a first part of the excited beam 50 from one excitation light source 110 is converted into the first color light 60Y, and a second part of the excited beam 50 forms the second color light 60B. For example, in the embodiment, a proportional value range of the second part of the excited beam 50 and the excited beam 50 ranges between 5% and 30%. It should be noted that the above value range is only used as an example, and is not used for limiting the invention.

Therefore, in the embodiment, the wavelength conversion module 420C is similar to the wavelength conversion module 120 of FIG. 1B, so as to achieve a same function, and the wavelength conversion module 420C may achieve effects and advantages similar to that of the aforementioned wavelength conversion module 120, and detail thereof is not repeated. Moreover, when the wavelength conversion module 420C is applied to the aforementioned illumination systems 100A, 200A, 200B, 300A, 300B, 300C and the projection apparatus 100, the illumination systems 100A, 200A, 200B, 300A, 300B, 300C and the projection apparatus 100 may achieve the similar effects and advantages, and details thereof are not repeated.

Figure 4D:
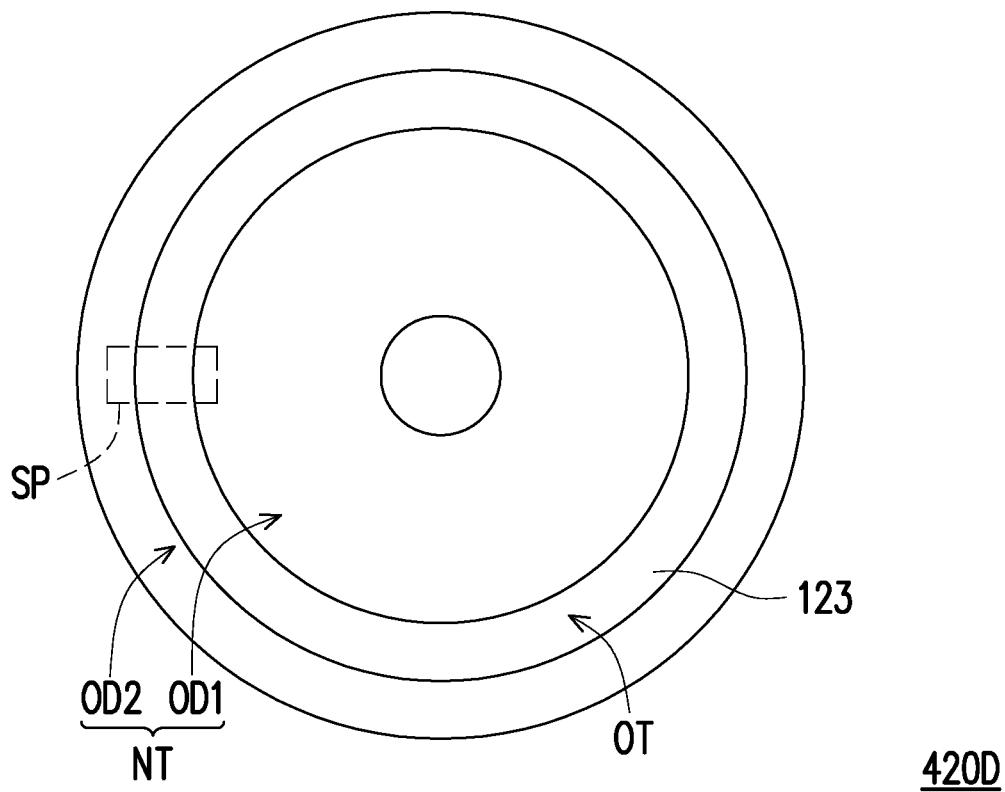
FIG. 4D is a top view of another wavelength conversion module of FIG. 1A.
Figure 4E:
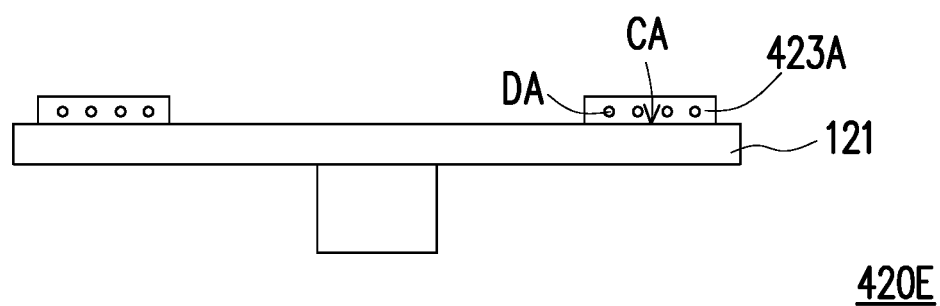
FIG. 4E to FIG. 4G are cross-sectional views of various wavelength conversion modules of FIG. 1A.

FIG. 4D is a top view of another wavelength conversion module of FIG. 1A. FIG. 4E is a cross-sectional view of another wavelength conversion module of FIG. 1A. The wavelength conversion modules 420D, 420E of FIG. 4D and FIG. 4E are respectively similar to the wavelength conversion modules 120, 420A of FIG. 1B and FIG. 4A, and differences there between are as follows. In the embodiment, the substrate 121 of the wavelength conversion modules 420D, 420E is a diffusion substrate, and the annular wavelength conversion layer 123 (or the annular wavelength conversion layer 423) is directly disposed on the substrate 121 to omit configuration of the annular diffusion layer 122. In the embodiment of FIG. 4D, the part of the substrate 121 that is not shielded by the annular wavelength conversion layer 123 may respectively form a first annular diffusion region OD1 at an inner side of the annular wavelength conversion layer 123 and form a second annular diffusion region OD2 at an outer side of the annular wavelength conversion layer 123, where the first annular diffusion region OD1 and the second annular diffusion region OD2 correspond to the non-conversion region NT of the wavelength conversion module 420D. In the embodiment of FIG. 4E, the cavities CA between the dot-like microstructures DA of the annular wavelength conversion layer 423 and the region of the substrate 121 under the cavities CA correspond to the non-conversion region NT of the wavelength conversion module 420E.

Therefore, when the excited beam 50 is incident to the wavelength conversion modules 420D, 420E, the first part of the excited beam 50 is converted into the first color light 60Y and the second part of the excited beam 50 forms the second color light 60B through the wavelength conversion modules 420D, 420E, so as to achieve the similar effects and advantages with that of the aforementioned wavelength conversion module 120, and detail thereof is not repeated. Moreover, when the wavelength conversion modules 420D, 420E are applied to the aforementioned illumination systems 100A, 200A, 200B, 300A, 300B, 300C and the projection apparatus 100, the illumination systems 100A, 200A, 200B, 300A, 300B, 300C and the projection apparatus 100 may achieve the similar effects and advantages, and details thereof are not repeated.

Figure 4F:
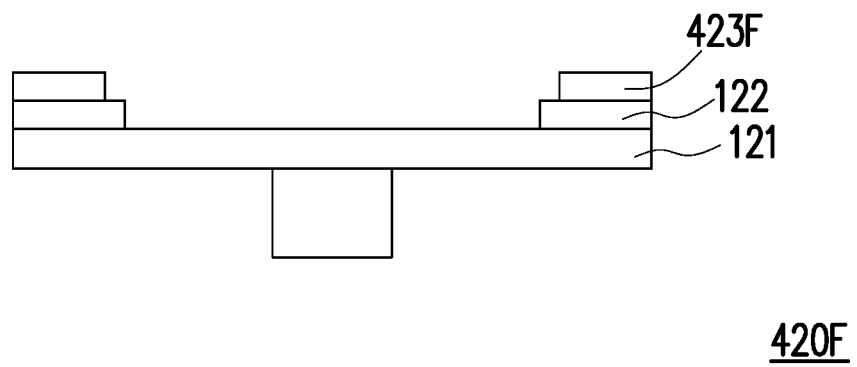
Figure 4G:
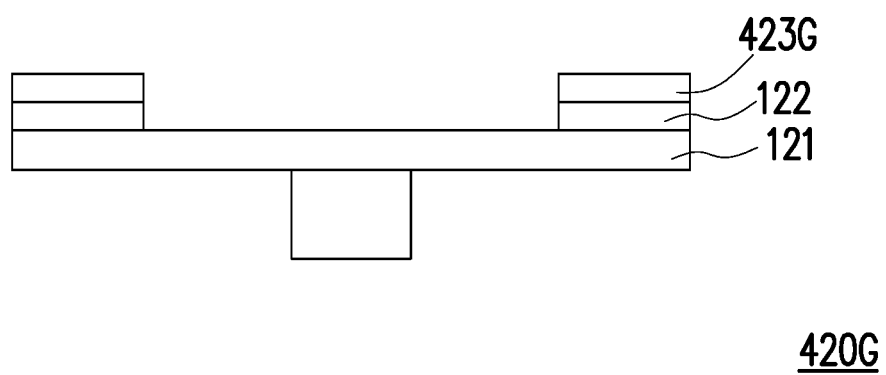

FIG. 4F and FIG. 4G are cross-sectional views of various wavelength conversion modules of FIG. 1A. The wavelength conversion modules 420F, 420G of FIG. 4F and FIG. 4G are respectively similar to the wavelength conversion modules 120, 420A of FIG. 1B and FIG. 4A, and differences there between are as follows. In the embodiment, outer diameter edges of the annular wavelength conversion layers 423F, 423G of FIG. 4F and FIG. 4G are aligned with an outer diameter edge of the substrate 121, and when the excited beam 50 is incident to the wavelength conversion modules 420F, 420G, a part of the excited beam 50 irradiates the annular wavelength conversion layers 423F, 423G, and another part of the excited beam does not irradiate the annular wavelength conversion layers 423F, 423G, for example, irradiates outside the substrate 121. Therefore, after the excited beam 50 is incident to the wavelength conversion modules 420F, 420G, the first part of the excited beam 50 is converted into the first color light 60Y and the second part of the excited beam 50 forms the second color light 60B through the wavelength conversion modules 420F, 420G, so as to achieve the similar effects and advantages with that of the aforementioned wavelength conversion modules 120, 420A, and detail thereof is not repeated. Moreover, when the wavelength conversion modules 420F, 420G are applied to the aforementioned illumination systems 100A, 200A, 200B, 300A, 300B, 300C and the projection apparatus 100, the illumination systems 100A, 200A, 200B, 300A, 300B, 300C and the projection apparatus 100 may achieve the similar effects and advantages, and details thereof are not repeated.

Figure 5A:
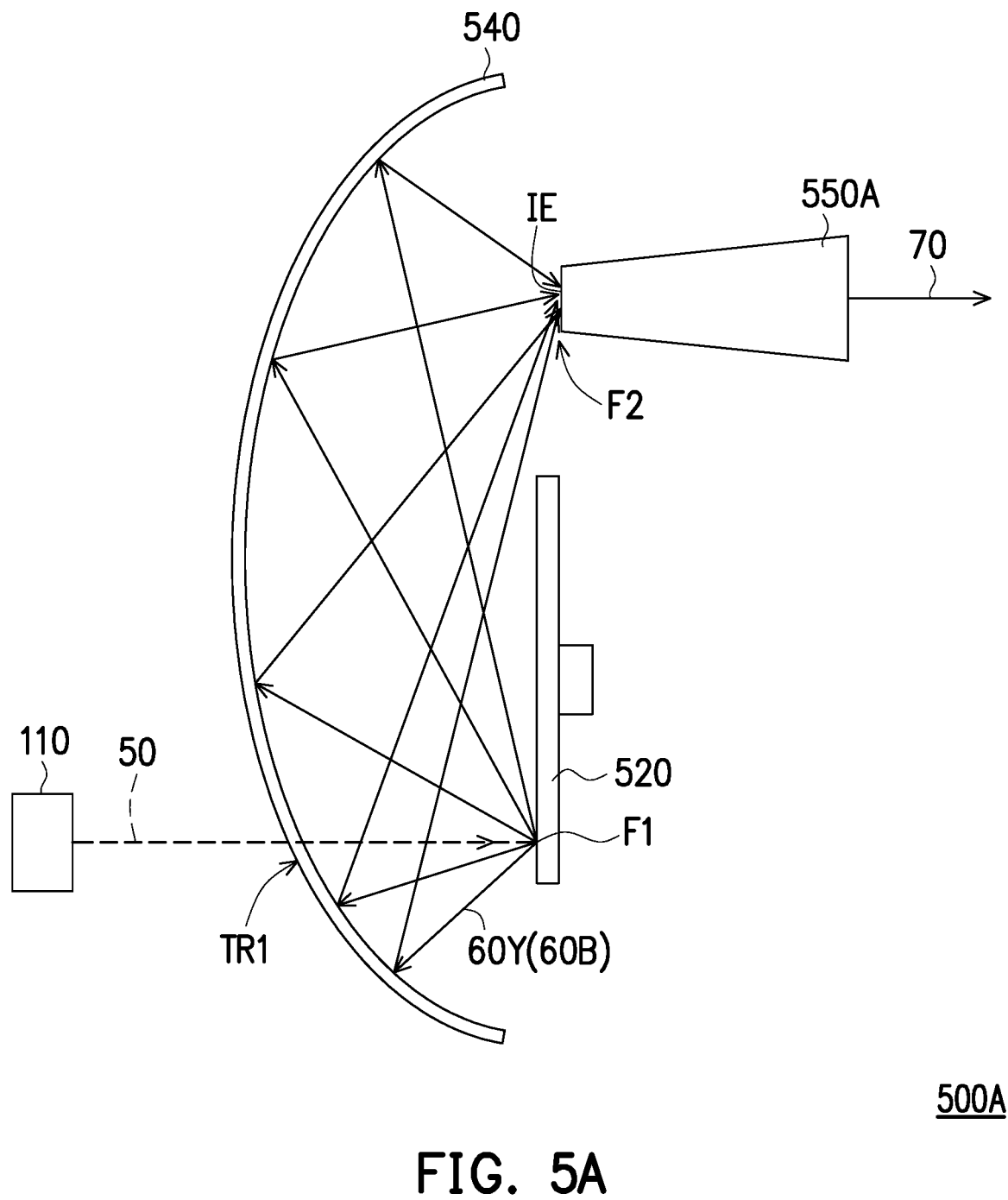
FIG. 5A is a structural schematic diagram of another illumination system of FIG. 1A.
Figure 5B:
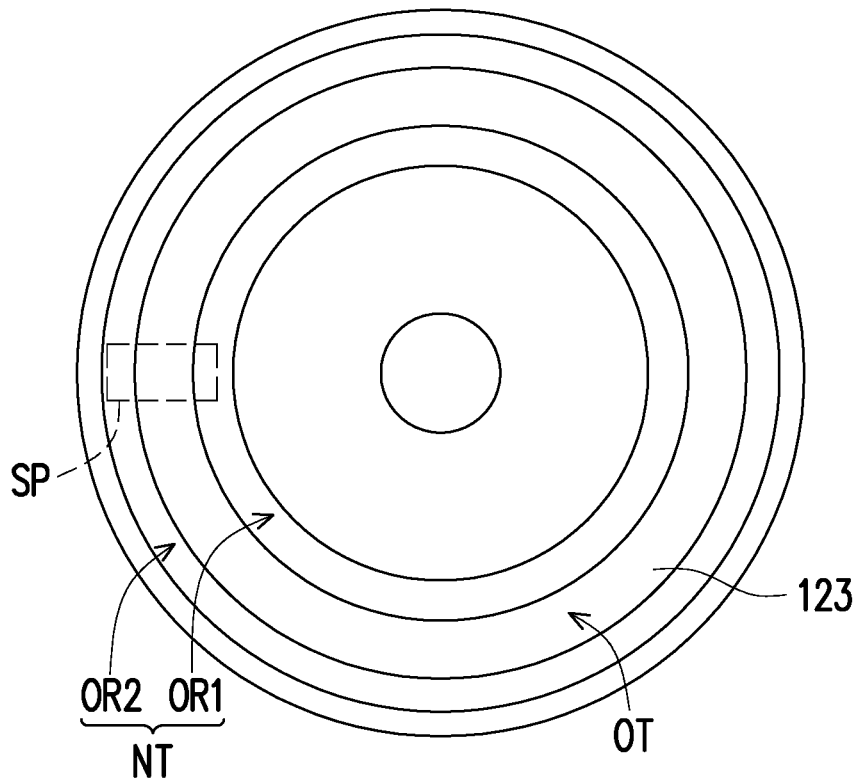
FIG. 5B is a top view of a wavelength conversion module of FIG. 5A.
Figure 5C:
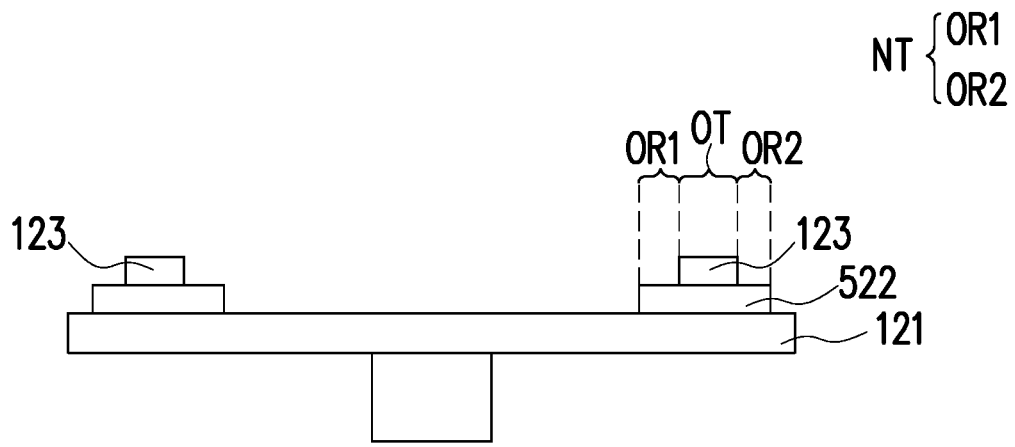
FIG. 5C is a cross-sectional view of the wavelength conversion module of FIG. 5B.

FIG. 5A is a structural schematic diagram of another illumination system of FIG. 1A. FIG. 5B is a top view of a wavelength conversion module of FIG. 5A. FIG. 5C is a cross-sectional view of the wavelength conversion module of FIG. 5B. The illumination system 500A of FIG. 5A is similar to the illumination system 100A of FIG. 1A, and differences there between are as follows. In the embodiment, the illumination system 500A further includes a curved reflecting element 540 and a first light uniforming element 550A. To be specific, as shown in FIG. 5A, in the embodiment, the curved reflecting element 540 is located between the excitation light source 110 and a wavelength conversion module 520, where the excited beam 50 from the excitation light source 110 is transmitted to the wavelength conversion module 520 after passing through a light transmission region TR1 on the curved reflecting element 540. For example, in the embodiment, the light transmission region TR1 is a through hole formed on the curved reflecting element 540, or formed by plating a dichroic film that is pervious to blue light on a part of region of the curved reflecting element 540.

Moreover, in the embodiment, the wavelength conversion module 520 of FIG. 5B is similar to the wavelength conversion module 120 of FIG. 1B, and differences there between are as follows. The substrate 521 of the wavelength conversion module 520 is a reflection substrate, and the annular diffusion layer 522 may be composed of a diffuse reflection material to form an annular reflective diffusion layer, and the annular diffusion layer 522 is located between the reflection substrate 521 and the annular wavelength conversion layer 123. In other words, in the embodiment, the annular diffusion layer 522 of the wavelength conversion module 520 further includes a first annular reflection region OR1 and a second annular reflection region OR2, where the first annular reflection region OR1 and the second annular reflection region OR2 are located on the substrate 521 and correspond to the non-conversion region NT of the wavelength conversion module 520. The annular wavelength conversion layer 123 is located between the first annular reflection region OR1 and the second annular reflection region OR2, and the annular wavelength conversion layer 123 surrounds the first annular reflection region OR1 and is surrounded by the second annular reflection region OR2. In this way, since the first annular reflection region OR1 and the second annular reflection region OR2 may also destroy coherence of the laser beam to have the laser speckle elimination function, when the excited beam 50 passes through the first annular reflection region OR1 and the second annular reflection region OR2, the blue light is formed, and the laser speckle phenomenon is eliminated.

Therefore, by configuring the annular wavelength conversion region OT, the first annular reflection region OR1 and the second annular reflection region OR2 in the wavelength conversion module 520, a first part of the excited beam 50 from one excitation light source 110 may be converted into the first color light 60Y by the annular wavelength conversion region OT, and a second part of the excited beam 50 forms the second color light 60B through the first annular reflection region OR1 and the second annular reflection region OR2. For example, in the embodiment, a proportional value range of the second part of the excited beam 50 and the excited beam 50 ranges between 5% and 30%. It should be noted that the above value range is only used as an example, and is not used for limiting the invention.

Further, as shown in FIG. 5A, in the embodiment, the curved reflecting element 540 is an elliptical reflecting element, and the excited beam 50 from the excitation light source 110 is converged to a focal point F1 of the curved reflecting element 540 through the light transmission region TR1 of the curved reflecting element 540. The wavelength conversion module 520 is located on the focal point F1, and a light incident end IE of the first light uniforming element 550A is located at another focal point F2 of the curved reflecting element 540. After the excited beam 50 is converted by the wavelength conversion module 520 to form the first color light 60Y and the second color light 60B, the first color light 60Y and the second color light 60B from the wavelength conversion module 520 are reflected to the light incident end IE of the first light uniforming element 550A by the curved reflecting element 540. In the embodiment, the first light uniforming element 550A may be an integration rod, though the invention is not limited thereto. Therefore, when the first color light 60Y and the second color light 60B from the wavelength conversion module 520 are transmitted to the first light uniforming element 550A, the first light uniforming element 550A may uniform the first color light 60Y and the second color light 60B to form the illumination beam 70.

In the embodiment, since the wavelength conversion module 520 has a similar structure with that of the wavelength conversion module 120 of FIG. 2A, the wavelength conversion module 520 may achieve effects and advantages similar with that of the aforementioned wavelength conversion module 120, and details thereof are not repeated. Moreover, since the illumination system 500A adopts the wavelength conversion module 520, the illumination system 500A may achieve effects and advantages similar with that of the aforementioned illumination system 100A, and details thereof are not repeated. In addition, when the illumination system 500A is applied to the projection apparatus 100, the projection apparatus 100 may also achieve the similar effects and advantages, and details thereof are not repeated.

Figure 5D:
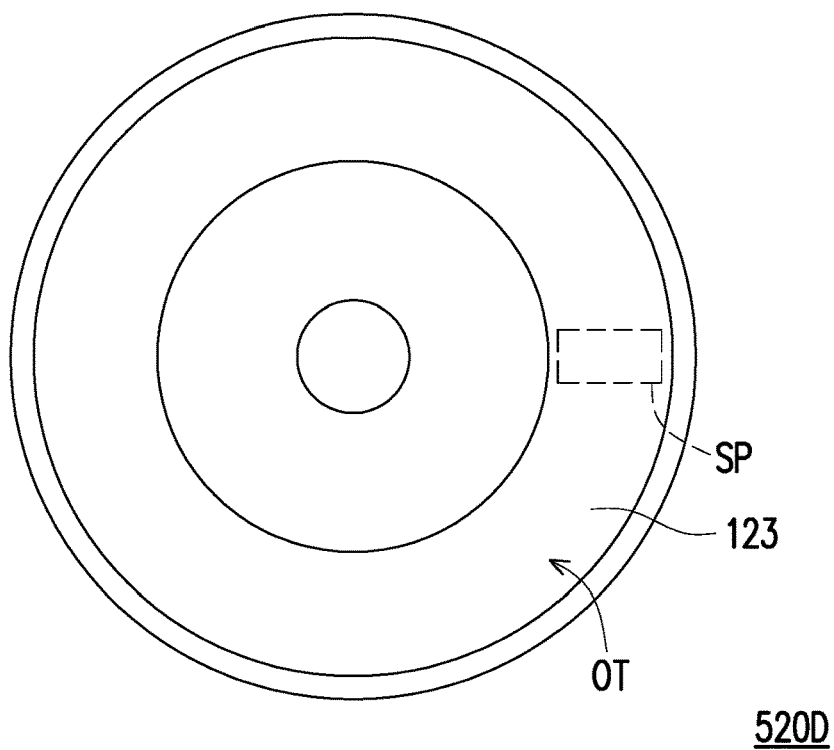
FIG. 5D is a top view of another wavelength conversion module of FIG. 5A.
Figure 5E:
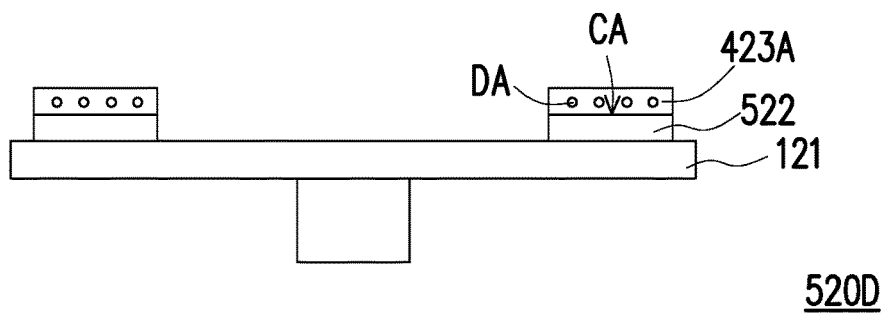
FIG. 5E is a cross-sectional view of the wavelength conversion module of FIG. 5D.

FIG. 5D is a top view of another wavelength conversion module of FIG. 5A. FIG. 5E is a cross-sectional view of the wavelength conversion module of FIG. 5D. The wavelength conversion module 520D of FIG. 5D and FIG. 5E is similar to the wavelength conversion module 420A of FIG. 4A, and differences there between are as follows. In the embodiment, the substrate 521 of the wavelength conversion module 520D is a reflection substrate, and the annular diffusion layer 522 may be composed of a diffuse reflection material to form an annular reflective diffusion layer.

In this way, based on configuration of a plurality of dot-like microstructures DA in the annular wavelength conversion region OT of the wavelength conversion module 520D, the first part of the excited beam 50 from one excitation light source 110 is converted into the first color light 60Y, and the second part thereof forms the second color light 60B after passing through the non-conversion region NT (the cavities CA). For example, in the embodiment, a proportional value range of the second part of the excited beam 50 and the excited beam 50 ranges between 5% and 30%. It should be noted that the above value range is only used as an example, and is not used for limiting the invention.

In the embodiment, since the wavelength conversion module 520D has a similar structure with that of the wavelength conversion module 420A of FIG. 4A, the wavelength conversion module 520D may achieve effects and advantages similar with that of the aforementioned wavelength conversion module 420A, and details thereof are not repeated. Moreover, when the wavelength conversion module 520D is applied to the aforementioned illumination system 500A and the projection apparatus 100, illumination system 500A and the projection apparatus 100 may also achieve the similar effects and advantages, and details thereof are not repeated.

Figure 5F:
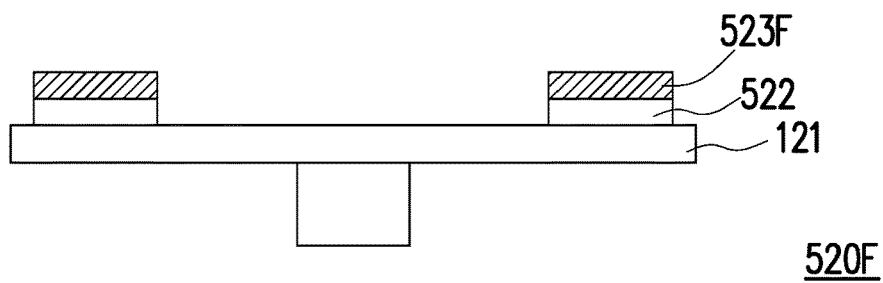
FIG. 5F is a cross-sectional view of another wavelength conversion module of FIG. 5A.

FIG. 5F is a cross-sectional view of another wavelength conversion module of FIG. 1A. The wavelength conversion module 520F of FIG. 5F is similar to the wavelength conversion module 520D of FIG. 5D, and differences there between are as follows. In the embodiment, when the annular wavelength conversion layer 523F satisfies a light absorbing condition, the second part of the excited beam 50 forms the second color light 60B after passing through the annular wavelength conversion layer 523F, where the light absorbing condition is that a volume concentration of a wavelength conversion material in the annular wavelength conversion layer 523F ranges between 30% and 85%, or a thickness of the annular wavelength conversion layer 523F ranges between 0.03 mm and 0.3 mm. It should be noted that the above value ranges are only used as an example, and are not used for limiting the invention.

Therefore, by configuring the annular wavelength conversion region OT in the wavelength conversion module 520F, the first part of the excited beam 50 from one excitation light source 110 may be converted into the first color light 60Y, and the second part of the excited beam 50 forms the second color light 60B. For example, in the embodiment, a proportional value range of the second part of the excited beam 50 and the excited beam 50 ranges between 5% and 30%. It should be noted that the above value range is only used as an example, and is not used for limiting the invention.

In the embodiment, since the wavelength conversion module 520F has a similar structure with that of the wavelength conversion module 520D of FIG. 5D, the wavelength conversion module 520F may achieve effects and advantages similar with that of the aforementioned wavelength conversion module 520D, and details thereof are not repeated. Moreover, when the wavelength conversion module 520F is applied to the aforementioned illumination system 500A and the projection apparatus 100, illumination system 500A and the projection apparatus 100 may also achieve the similar effects and advantages, and details thereof are not repeated.

Figure 6A:
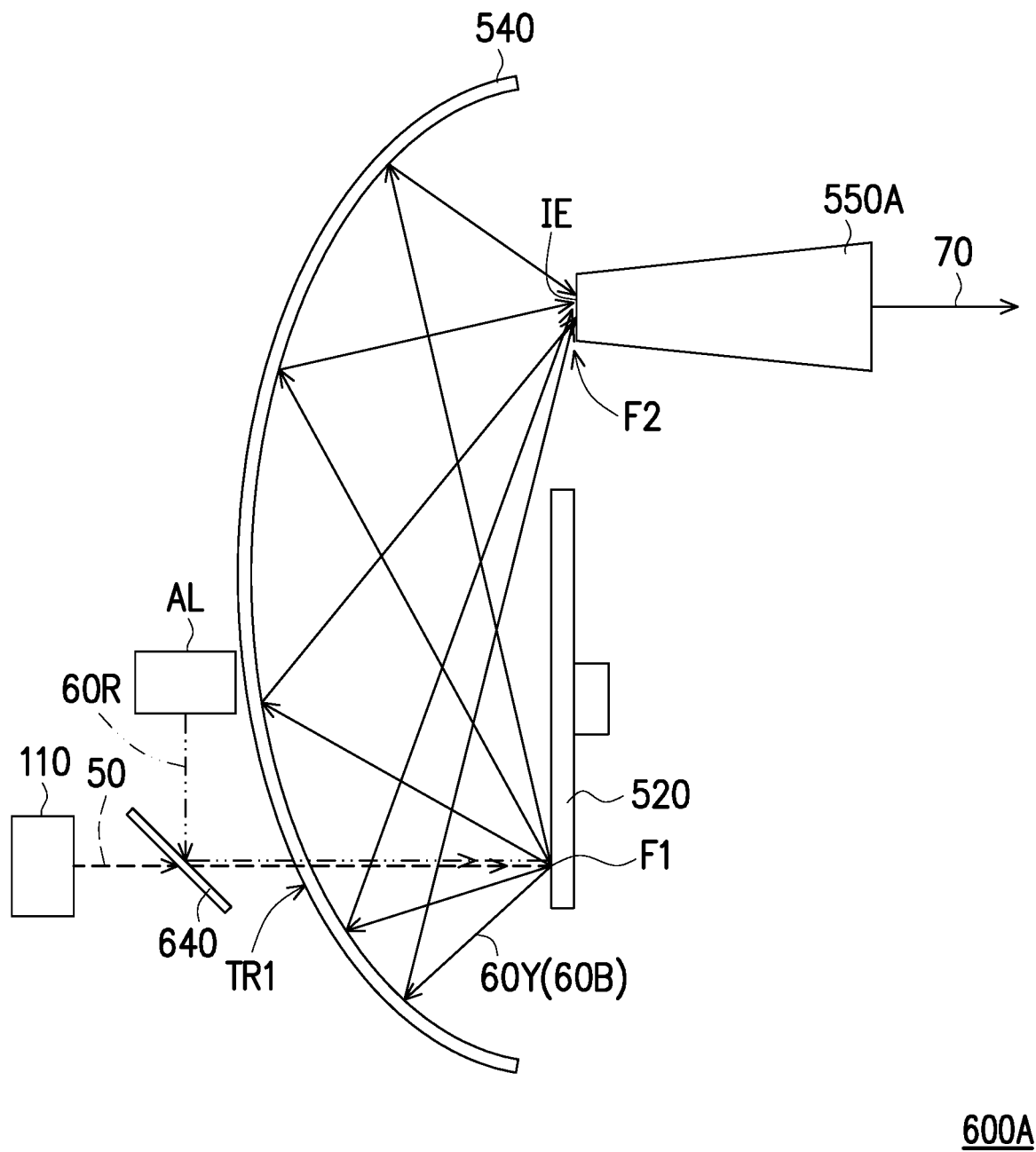
FIG. 6A to FIG. 6C are structural schematic diagrams of various illumination systems of FIG. 1A.

FIG. 6A is a structural schematic diagram of another illumination system of FIG. 1A. The illumination system 600A of FIG. 6A is similar to the illumination system 500A of FIG. 5A, and differences there between are as follows. In the embodiment, the illumination system 600A further includes an auxiliary light source AL. The auxiliary light source AL is configured to emit an auxiliary beam 60R, and a waveband of the auxiliary beam 60R is at least partially overlapped with a waveband of the first color light 60Y, where the auxiliary beam 60R is transmitted to the light incident end IE of the first light uniforming element 550A after passing through the curved reflecting element 540.

For example, as shown in FIG. 6A, in the embodiment, the illumination system 600A further includes a third dichroic element 640 disposed on the transmission path of the auxiliary beam 60R. The third dichroic element 640 is a dichroic mirror (DMR) with a red light reflection function, which is pervious to blue light and reflects red light. The light transmission region TR1 is, for example, a through hole formed on the curved reflecting element 540, or formed by plating a dichroic film that is pervious to blue light and red light on a part of region of the curved reflecting element 540. In this way, the auxiliary beam 60R is transmitted by the third dichroic element 640 to pass through the light transmission region TR1 of the curved reflecting element 540, and is sequentially reflected by the wavelength conversion module 520 and the curved reflecting element 540 to reach the light incident end IE of the first light uniforming element 550A. In this way, the auxiliary beam 60R, the first color light 60Y and the second color light 60B are combined to form the illumination beam 70 after passing through the first light uniforming element 550A.

In this way, by configuring the auxiliary light source AL in the illumination system 600A, a proportion of the red light in the illumination beam 70 is increased, so as to improve a red color performance of the projected image. Moreover, in the embodiment, since the illumination system 600A may also adopt the structure of the wavelength conversion module 520 (or the wavelength conversion modules 520D, 520F) adopted by the aforementioned illumination system 500A, the illumination system 600A may achieve effects and advantages similar to that of the illumination system 500A, and details thereof are not repeated. Moreover, when the illumination system 600A is applied to the aforementioned projection apparatus 100, the projection apparatus 100 may also achieve the similar effects and advantages, and detail thereof is not repeated.

Figure 6B:
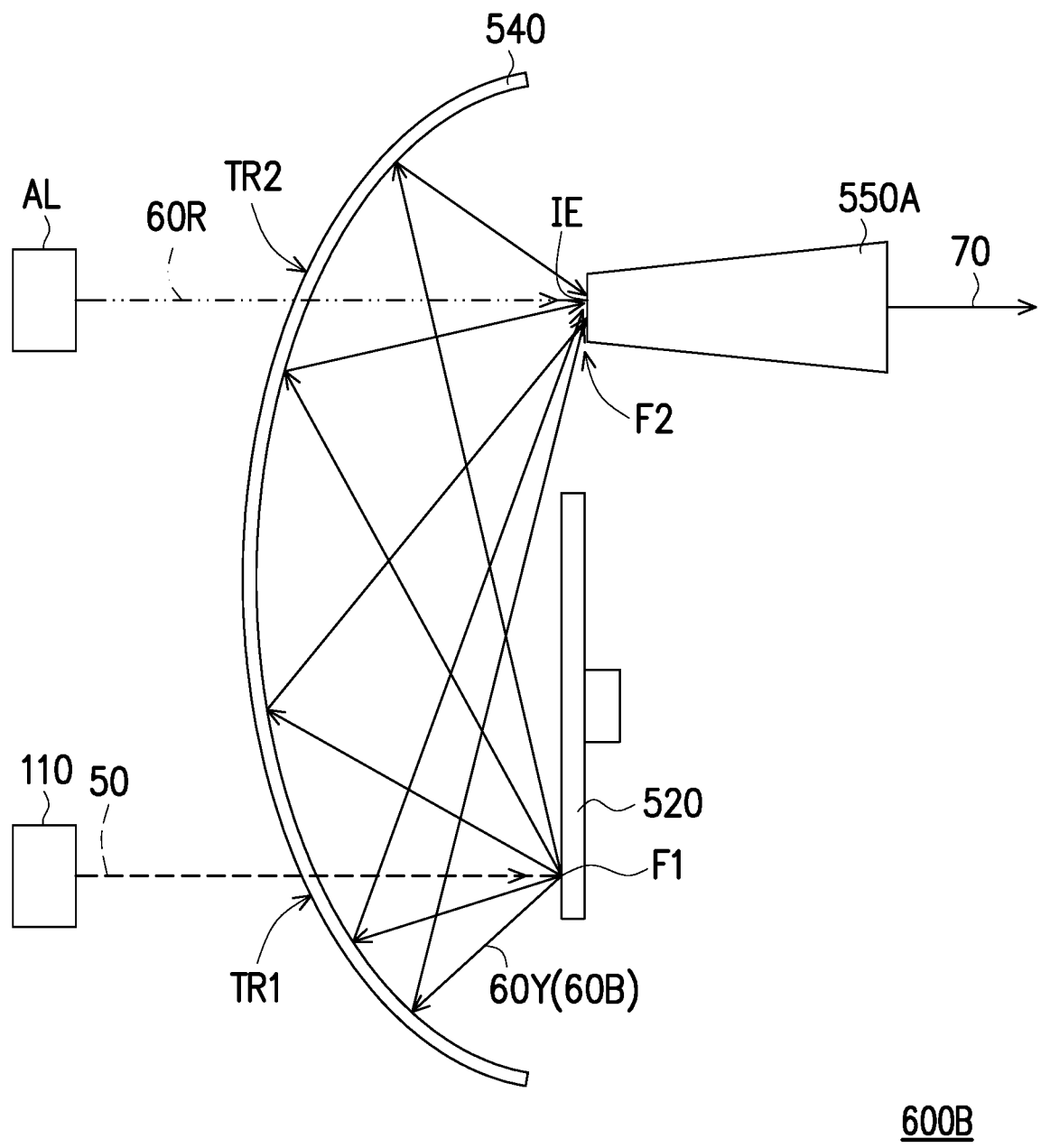

FIG. 6B is a structural schematic diagram of another illumination system of FIG. 1A. The illumination system 600B of FIG. 6B is similar to the illumination system 600A of FIG. 6A, and differences there between are as follows. In the embodiment, the curved reflecting element 540 has another light transmission region TR2, which is disposed on the transmission path of the auxiliary beam 60R. To be specific, as shown in FIG. 6B, in the embodiment, the auxiliary beam 60R may be directly transmitted to the light incident end IE of the first light uniforming element 550A through the light transmission region TR2. In this way, the auxiliary beam 60R and the first color light 60Y and the second color light 60B from the wavelength conversion module 520 and the curved reflecting element 540 are combined by the first light uniforming element 550A to form the illumination beam 70.

In this way, by configuring the auxiliary light source AL in the illumination system 600B, a proportion of the red light in the illumination beam 70 is increased, so as to improve a red color performance of the projected image. Moreover, in the embodiment, since the illumination system 600B may also adopt the structure of the wavelength conversion module 520 (or the wavelength conversion modules 520D, 520F) adopted by the aforementioned illumination system 600A, the illumination system 600B may achieve effects and advantages similar to that of the illumination system 600A, and details thereof are not repeated. Moreover, when the illumination system 600B is applied to the aforementioned projection apparatus 100, the projection apparatus 100 may also achieve the similar effects and advantages, and detail thereof is not repeated.

Figure 6C:
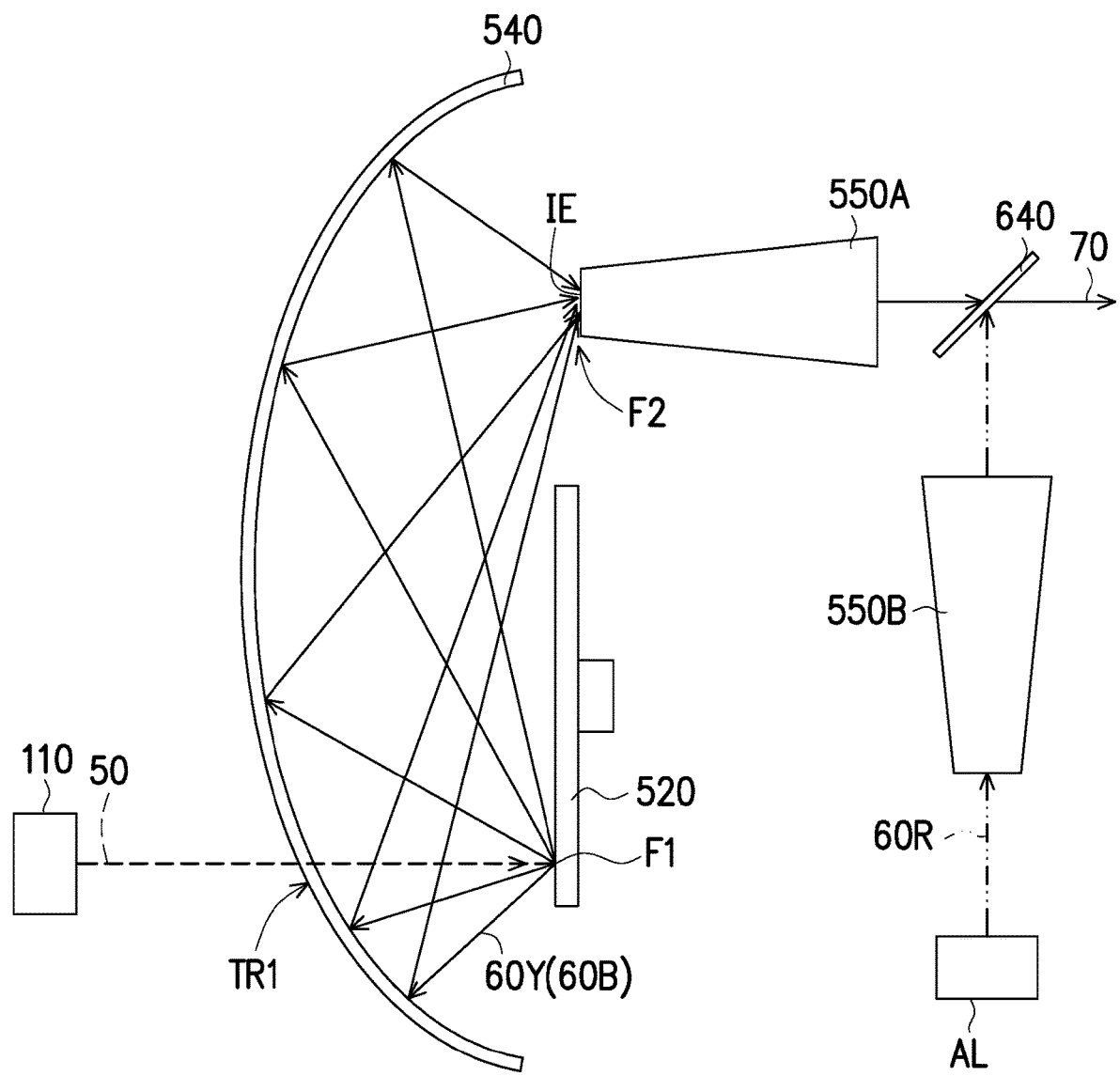

FIG. 6C is a structural schematic diagram of another illumination system of FIG. 1A. The illumination system 600C of FIG. 6C is similar to the illumination system 500A of FIG. 5A, and differences there between are as follows. In the embodiment, the illumination system 600C further includes an auxiliary light source AL, a second light uniforming element 550B and a third dichroic element 640. The auxiliary light source AL is configured to emit an auxiliary beam 60R, and a waveband of the auxiliary beam 60R is at least partially overlapped with a waveband of the first color light 60Y.

To be specific, as shown in FIG. 6C, the second light uniforming element 550B is located on the transmission path of the auxiliary beam 60R, and is adapted to uniform the auxiliary beam 60R. On the other hand, the third dichroic element 640 is located on the transmission paths of the auxiliary beam 60R and the first color light 60Y and the second color light 60B from the first light uniforming element 550A. For example, in the embodiment, the third dichroic element 640 is adapted to reflect the auxiliary beam 60R, and is pervious to the partial first color light 60G and the second color light 60B, though the invention is not limited thereto. In another embodiment, the third dichroic element 640 is pervious to the auxiliary beam 60R, and reflects the partial first color light 60G and the second color light 60B. In this way, the partial first color light 60G and the second color light 60B from the first light uniforming element 550A and the auxiliary beam 60R from the second light uniforming element 550B form the illumination beam 70 after passing through the third dichroic element 640.

In this way, by configuring the auxiliary light source AL in the illumination system 600C, a proportion of the red light in the illumination beam 70 is increased, so as to improve a red color performance of the projected image. Moreover, in the embodiment, since the illumination system 600C may also adopt the structure of the wavelength conversion module 520 (or the wavelength conversion modules 520D, 520F) adopted by the aforementioned illumination system 500A, the illumination system 600C may achieve effects and advantages similar to that of the illumination system 500A, and details thereof are not repeated. Moreover, when the illumination system 600C is applied to the aforementioned projection apparatus 100, the projection apparatus 100 may also achieve the similar effects and advantages, and detail thereof is not repeated.

Figure 7A:
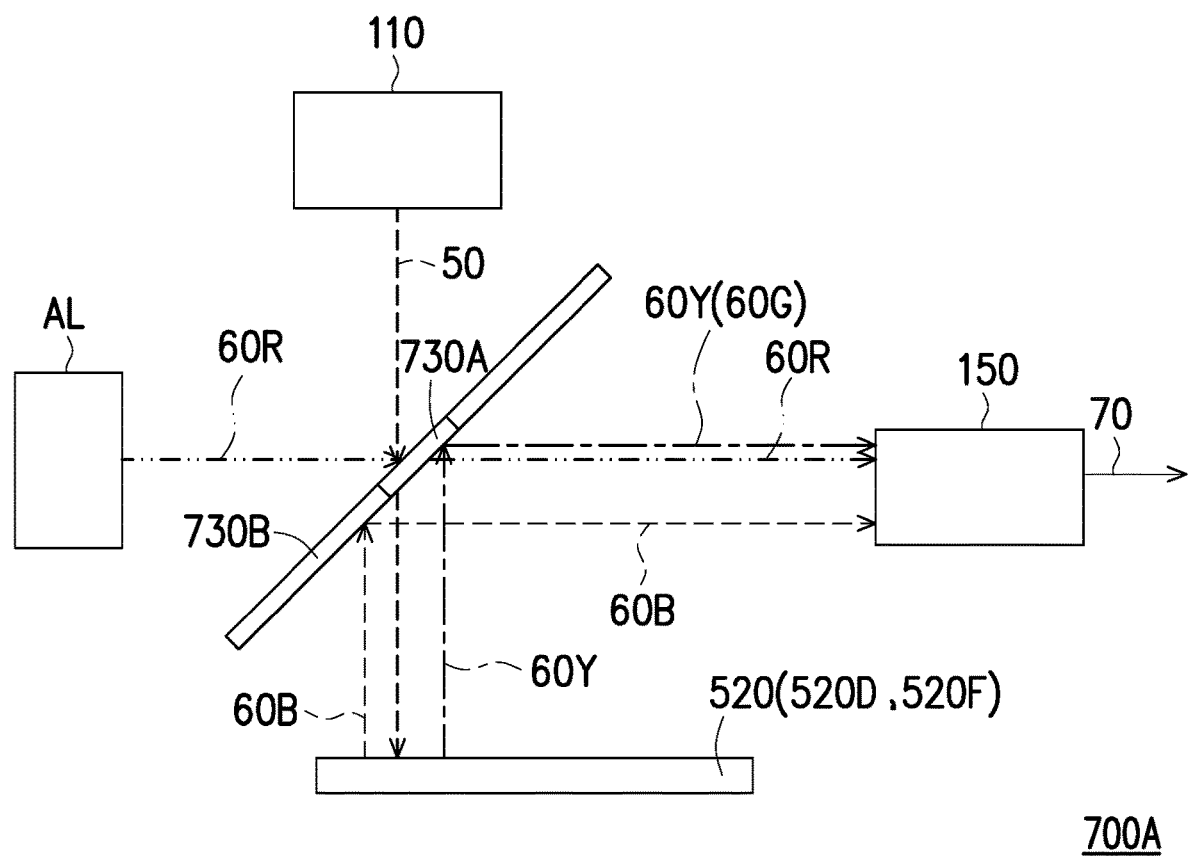
FIG. 7A is a structural schematic diagram of another illumination system of FIG. 1A.
Figure 7B:
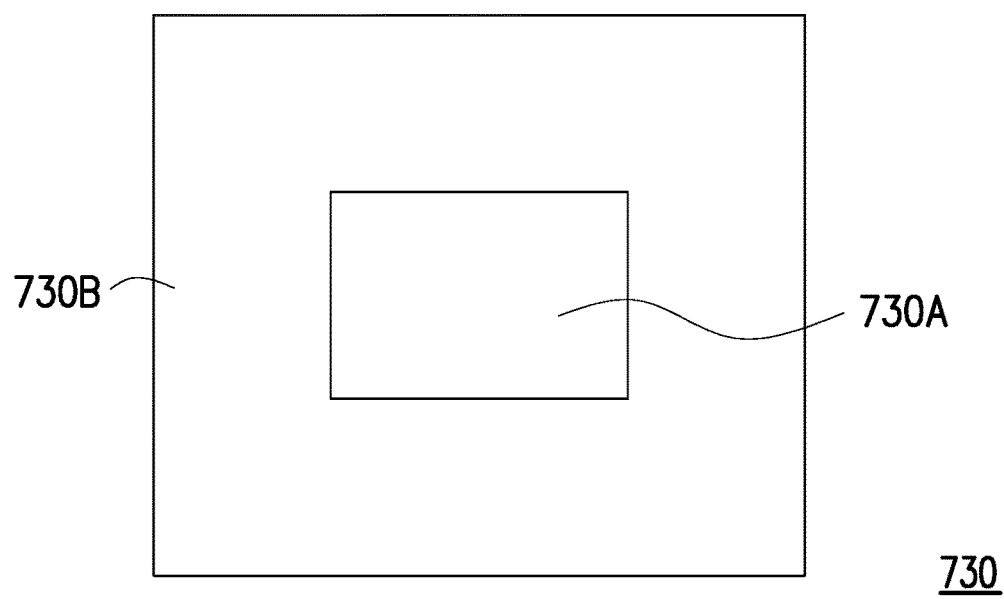
FIG. 7B is a top view of a beam splitting element of FIG. 7A.

FIG. 7A is a structural schematic diagram of another illumination system of FIG. 1A. FIG. 7B is a top view of a beam splitting element of FIG. 7A. In the embodiment, the illumination system 700A includes the excitation light source 110, the aforementioned wavelength conversion module 520 (or the wavelength conversion modules 520D, 520F), a fourth dichroic element 730 and a light uniforming element 150. Structure details of the excitation light source 110, the wavelength conversion module 520 (or the wavelength conversion modules 520D, 520F) and the light uniforming element 150 may refer to the aforementioned related description, and details thereof are not repeated.

To be specific, as shown in FIG. 7A, in the embodiment, the fourth dichroic element 730 is located between the excitation light source 110 and the wavelength conversion module 520, where the fourth dichroic element 730 has a first region 730A and a second region 730B, and the second region 730B surrounds the first region 730A. For example, in the embodiment, the first region 730A of the fourth dichroic element 730 may be a through hole, or formed by plating a dichroic film that is pervious to blue light and reflects yellow light thereon. On the other hand, the second region 730B of the fourth dichroic element 730 is plated with a reflective coating to reflect blue light and yellow light.

In this way, as shown in FIG. 7A, in the embodiment, the first region 730A of the fourth dichroic element 730 may be pervious to the excited beam 50, and the excited beam 50 is transmitted to the wavelength conversion module 520. The excited beam 50 incident to the wavelength conversion module 520 is converted into the first color light 60Y and the second color light 60B, and the first color light 60Y and the second color light 60B are reflected back to the fourth dichroic element 730. Thereafter, the first region 730A of the fourth dichroic element 730 reflects the first color light 60Y, and the second region 730B reflects the first color light 60Y and the second color light 60B from the wavelength conversion module 520. In this way, the first color light 60Y and the second color light 60B may be guided to the light uniforming element 150 through the fourth dichroic element 730 to form the illumination beam 70.

Moreover, as shown in FIG. 7A, in the embodiment, the illumination system 700A may selectively include an auxiliary light source AL. The auxiliary light source AL is configured to emit an auxiliary beam 60R, where a waveband of the auxiliary beam 60R is at least partially overlapped with a waveband of the first color light 60Y. In the embodiment, the auxiliary beam 60R is, for example, red light. When the illumination system 700A includes the auxiliary light source AL, the first region 730A of the fourth dichroic element 730 may be a through hole, or the first region 730A may be plated with a dichroic film that is pervious to blue light and red light and reflects green light, and the second region 730B of the fourth dichroic element 730 may be plated with a dichroic film that is pervious to red light and reflects other colors of light. In this way, the auxiliary beam 60R, the partial first color light 60G and the second color light 60B are guided to the light uniforming element 150 after passing through the fourth dichroic element 730, and are combined to form the illumination beam 70.

In this way, since the illumination system 700A may also adopt the structure of the wavelength conversion module 520 (or the wavelength conversion modules 520D, 520F) adopted by the aforementioned illumination system 500A, the illumination system 700A may achieve effects and advantages similar to that of the illumination system 500A, and details thereof are not repeated. Moreover, when the illumination system 700A is applied to the aforementioned projection apparatus 100, the projection apparatus 100 may also achieve the similar effects and advantages, and detail thereof is not repeated. In addition, by configuring the auxiliary light source AL in the illumination system 700A, a proportion of the red light in the illumination beam 70 is increased, so as to improve the red color performance of the projected image.

Figure 8A:
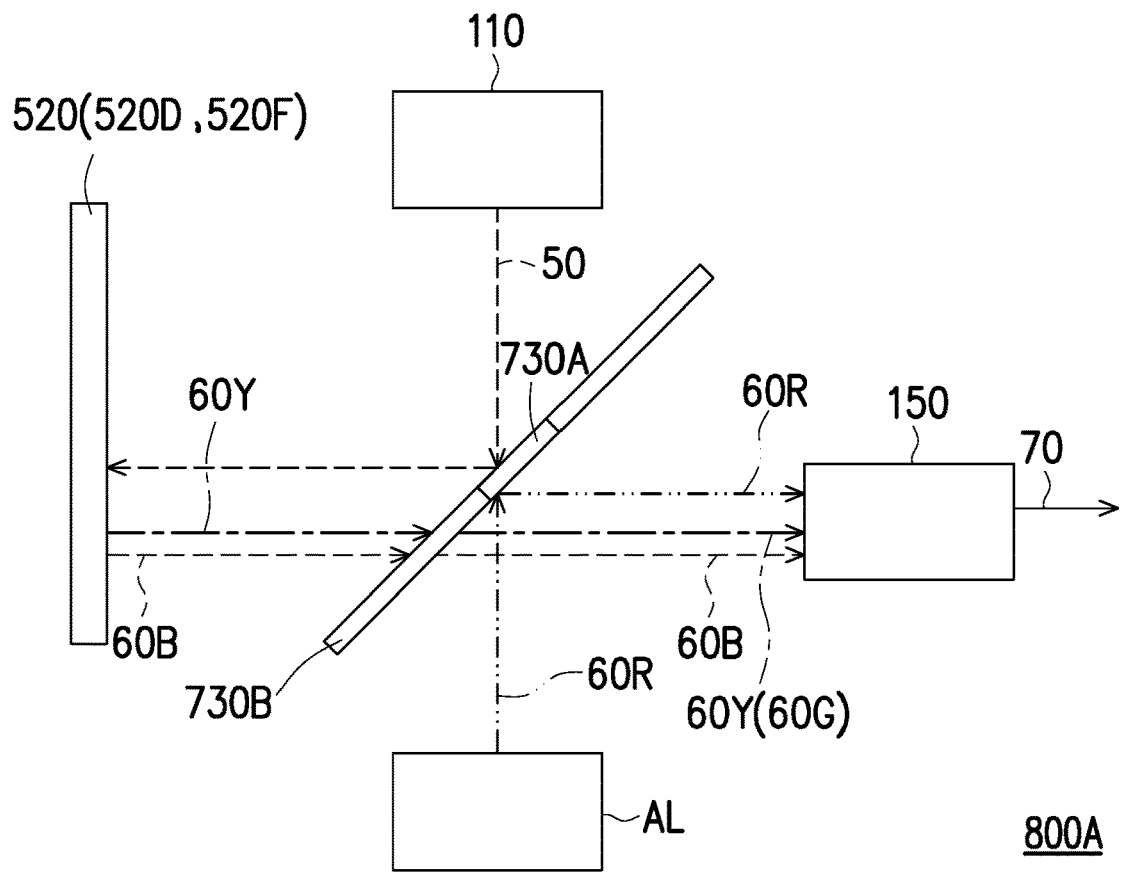
FIG. 8A is a structural schematic diagram of another illumination system of FIG. 1A.
Figure 8B:
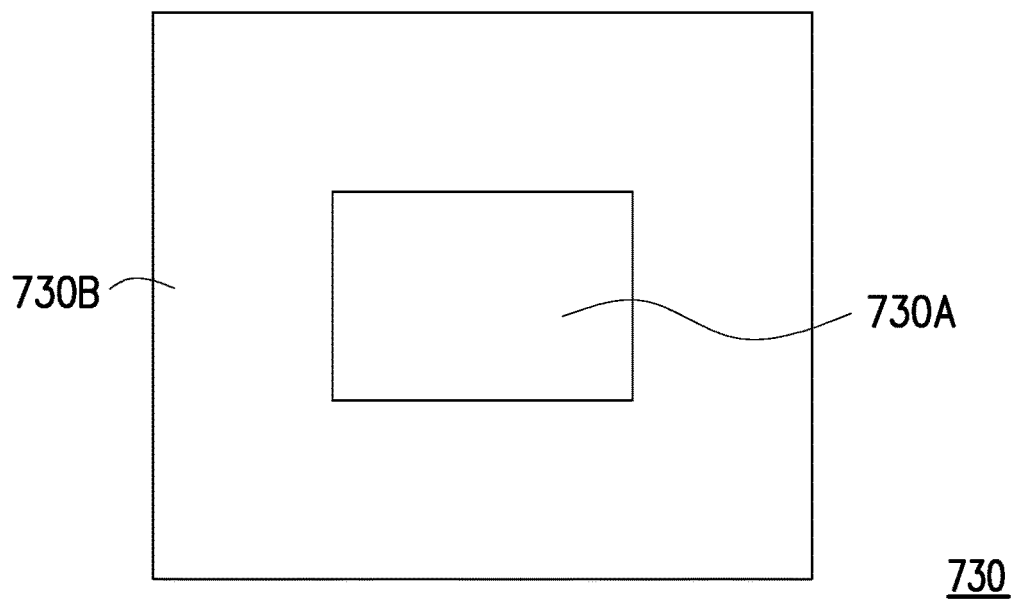
FIG. 8B is a top view of a beam splitting element of FIG. 8A.

FIG. 8A is a structural schematic diagram of another illumination system of FIG. 1A. FIG. 8B is a top view of a beam splitting element of FIG. 8A. The illumination system 800A of FIG. 8A is similar to the illumination system 700A of FIG. 7A, and differences there between are as follows. In the embodiment, the first region 730A of the fourth dichroic element 730 is plated with a dichroic film that is pervious to yellow light and reflects blue light, and is adapted to reflect the excited beam 50 and is pervious to the first color light 60Y. The second region 730B of the fourth dichroic element 730 may be a transparent region, and is pervious to the first color light 60Y and the second color light 60B from the wavelength conversion module 520 (or the wavelength conversion modules 520D, 520F).

In this way, as shown in FIG. 8A, in the embodiment, the first region 730A of the fourth dichroic element 730 may reflect the excited beam 50 to transmit it to the wavelength conversion module 520. The excited beam 50 incident to the wavelength conversion module 520 is converted into the first color light 60Y and the second color light 60B, and the first color light 60Y and the second color light 60B are transmitted to the fourth dichroic element 730. Thereafter, the first region 730A of the fourth dichroic element 730 is pervious to the first color light 60Y, and the second region 730B is pervious to the first color light 60Y and the second color light 60B from the wavelength conversion module 520. In this way, the first color light 60Y and the second color light 60B may be guided to the light uniforming element 150 through the fourth dichroic element 730 to form the illumination beam 70.

Moreover, as shown in FIG. 8A, in the embodiment, the illumination system 800A may selectively include an auxiliary light source AL. When the illumination system 800A includes the auxiliary light source AL, the first region 730A of the fourth dichroic element 730 may be plated with a dichroic film that is pervious to green light and reflects blue light and red light, and the second region 730B may be plated with a dichroic film that is adapted to reflect red light and pervious to other colors of light. In this way, the auxiliary beam 60R, the partial first color light 60G and the second color light 60B are guided to the light uniforming element 150 after passing through the fourth dichroic element 730, and are combined to form the illumination beam 70.

In this way, since the illumination system 800A may also adopt the structure of the wavelength conversion module 520 (or the wavelength conversion modules 520D, 520F) adopted by the aforementioned illumination system 700A, the illumination system 800A may achieve effects and advantages similar to that of the illumination system 700A, and details thereof are not repeated. Moreover, when the illumination system 800A is applied to the aforementioned projection apparatus 100, the projection apparatus 100 may also achieve the similar effects and advantages, and detail thereof is not repeated. In addition, by configuring the auxiliary light source AL in the illumination system 800A, a proportion of the red light in the illumination beam 70 is increased, so as to improve the red color performance of the projected image.

Figure 9A:
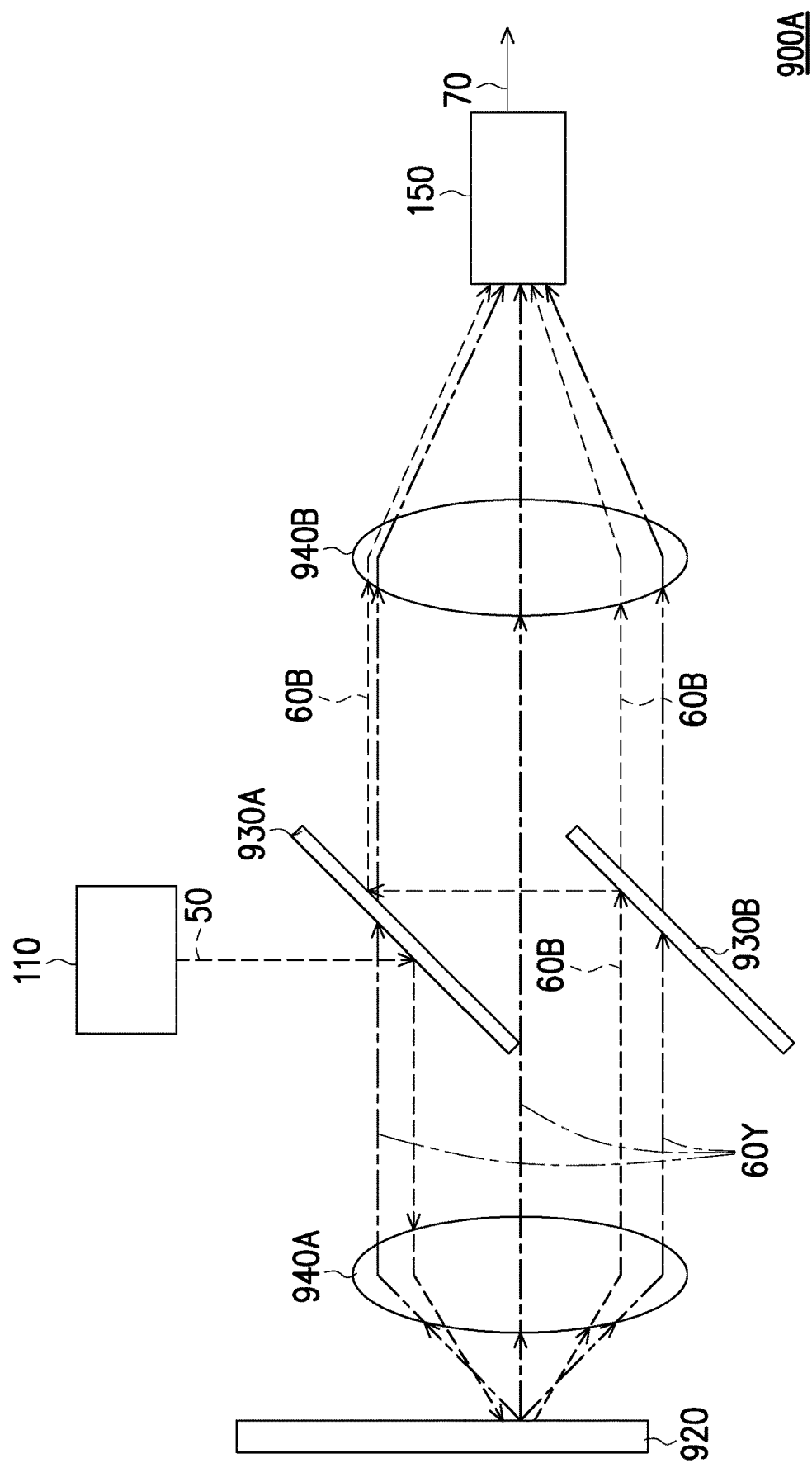
FIG. 9A is a structural schematic diagram of another illumination system of FIG. 1A.
Figure 9B:
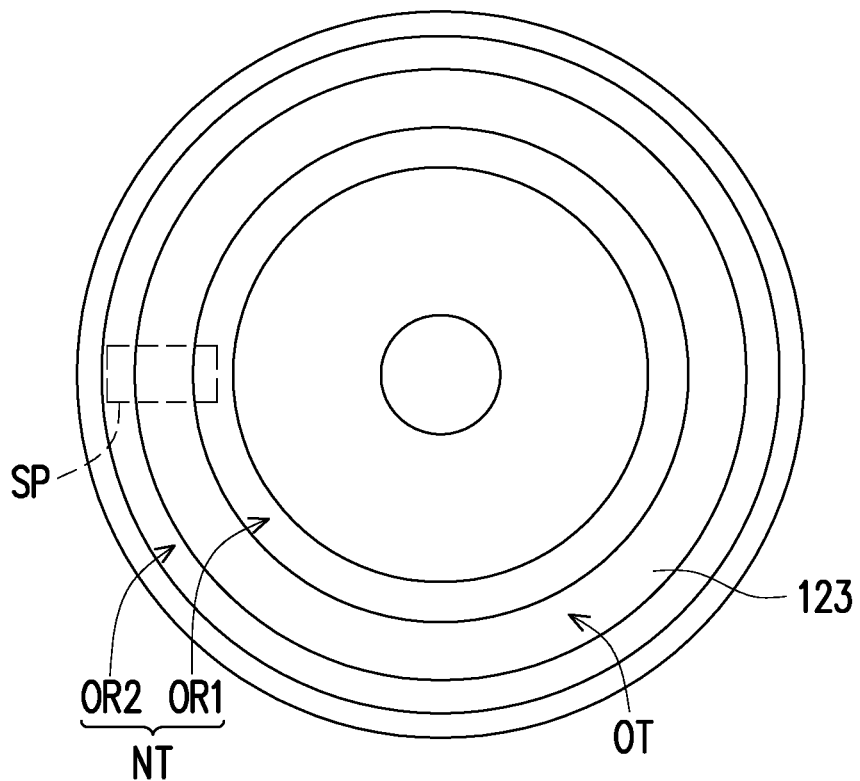
FIG. 9B is a top view of a wavelength conversion module of FIG. 9A.
Figure 9C:
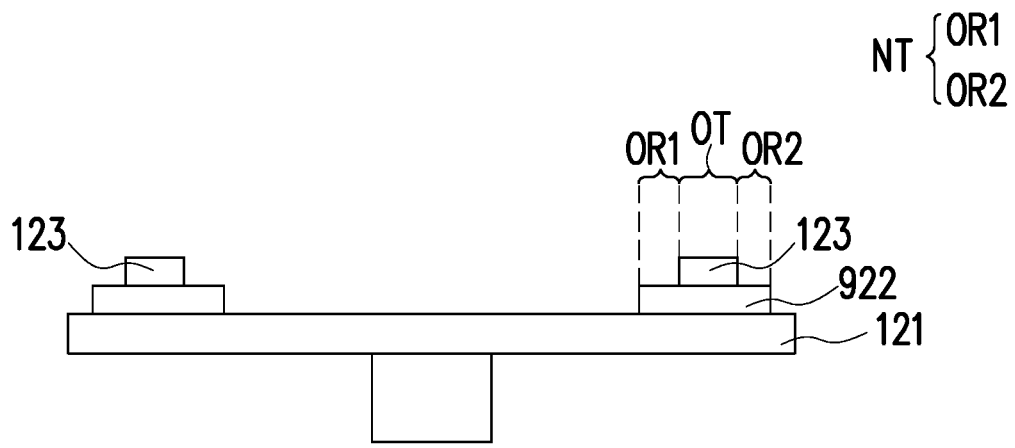
FIG. 9C is a cross-sectional view of the wavelength conversion module of FIG. 9B.

FIG. 9A is a structural schematic diagram of another illumination system of FIG. 1A. FIG. 9B is a top view of a wavelength conversion module of FIG. 9A. FIG. 9C is a cross-sectional view of the wavelength conversion module of FIG. 9B. In the embodiment, the illumination system 900A of FIG. 9A is similar to the illumination system 800A of FIG. 8A, and the wavelength conversion module 920 of FIG. 9B is similar to the wavelength conversion module 520 of FIG. 5B, and differences there between are as follows. In the wavelength conversion module 920 of the embodiment, the annular diffusion layer 122 is replaced by a mirror reflection layer 922 to construct the first annular reflection region OR1 and the second annular reflection region OR2. Moreover, the illumination system 900A does not include the fourth dichroic element 730, but includes a fifth dichroic element 930A, a sixth dichroic element 930B, a first condensing lens group 940A and a second condensing lens group 940B.

To be specific, as shown in FIG. 9A, in the embodiment, the fifth dichroic element 930A is located between the excitation light source 110 and the wavelength conversion module 920, and the first condensing lens group 940A is located between the fifth dichroic element 930A, the sixth dichroic element 930B and the wavelength conversion module 920. In the embodiment, the fifth dichroic element 930A is, for example, a dichroic mirror DMB with a blue light reflection function. In this way, the excited beam 50 from the excitation light source 110 is guided to the first condensing lens group 940A through the fifth dichroic element 930A, and is obliquely incident to the wavelength conversion module 920 through the first condensing lens group 940A, and is then converted into the first color light 60Y and the second color light 60B.

Moreover, since the wavelength conversion module 920 of the embodiment and the wavelength conversion module 520 of FIG. 5B have the similar structure, through the configuration of the annular wavelength conversion region OT, the first part of the excited beam 50 from one excitation light source 110 is converted into the first color light 60Y, and through the configuration of the first annular reflection region OR1 and the second annular reflection region OR2, the second part of the excited beam 50 forms the second color light 60B.

Therefore, the wavelength conversion module 920 may achieve the similar effects and advantages with that of the aforementioned wavelength conversion module 520, and details thereof are not repeated.

Then, as shown in FIG. 9A, in the embodiment, the sixth dichroic element 930B may be a Blue Half Mirror (BHM), which is pervious to a part of the second color light 60B, and reflects another part of the second color light 60B, and is pervious to other colors of light (for example, the first color light 60Y).

In this way, the first color light 60Y converted through the annular wavelength conversion region OT of the wavelength conversion module 920 has a larger divergence angle, so that the first color light 60Y from the wavelength conversion module 920 is obliquely incident to the first condensing lens group 940A, and is transmitted to the second condensing lens group 940B after passing through the fifth dichroic element 930A and the sixth dichroic element 930B.

On the other hand, regarding the second color light 60B formed through reflection of the first annular reflection region OR1 or the second annular reflection region OR2 of the wavelength conversion module 920, since the first annular reflection region OR1 and the second annular reflection region OR2 of the embodiment are composed of a mirror reflection layer, the second color light 60B from the wavelength conversion module 920 is eccentrically and obliquely incident to the first condensing lens group 940A, and is then transmitted to the sixth dichroic element 930B. The sixth dichroic element 930B is pervious to a part of the second color light 60B, and reflects another part of the second color light 60B. In this way, after passing through the sixth dichroic element 930B, a part of the second color light 60B is transmitted to the fifth dichroic element 930A due to reflection of the sixth dichroic element 930B, and is then reflected to the second condensing lens group 940B, and another part of the second color light 60B penetrates through the sixth dichroic element 930B and is directly transmitted to the second condensing lens group 940B.

Then, as shown in FIG. 9A, in the embodiment, the second condensing lens group 940B is located on a transmission path of the second color light 60B and the first color light 60Y from the fifth dichroic element 930A and the sixth dichroic element 930B, and is used for converging the second color light 60B and the first color light 60Y from the fifth dichroic element 930A and the sixth dichroic element 930B. In this way, the first color light 60Y and the second color light 60B are guided to the light uniforming element 150 after passing through the second condensing lens group 940B, and are combined to form the illumination beam 70.

In this way, in the embodiment, since the illumination system 900A adopts the structure of the wavelength conversion module 920 having the function similar with that of the aforementioned wavelength conversion module 520, the illumination system 900A may achieve similar effects and advantages with that of the aforementioned illumination system 500A, and details thereof are not repeated. Moreover, when the illumination system 900A is applied to the aforementioned projection apparatus 100, the projection apparatus 100 may achieve the similar effects and advantages, and details thereof are not repeated.

Figure 9D:
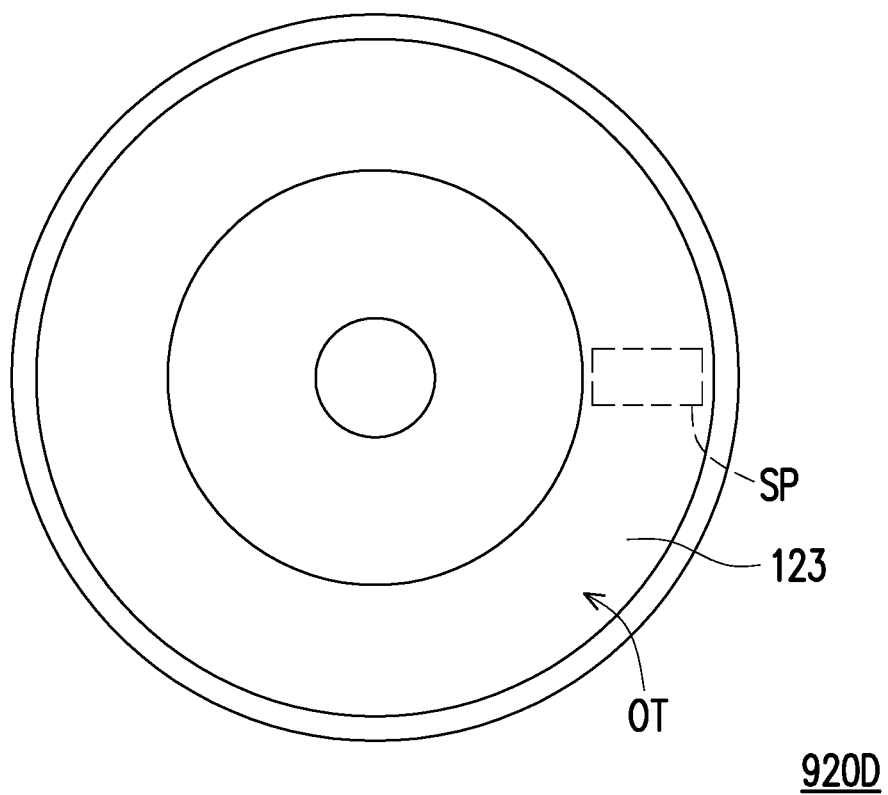
FIG. 9D is a top view of another wavelength conversion module of FIG. 9A.
Figure 9E:
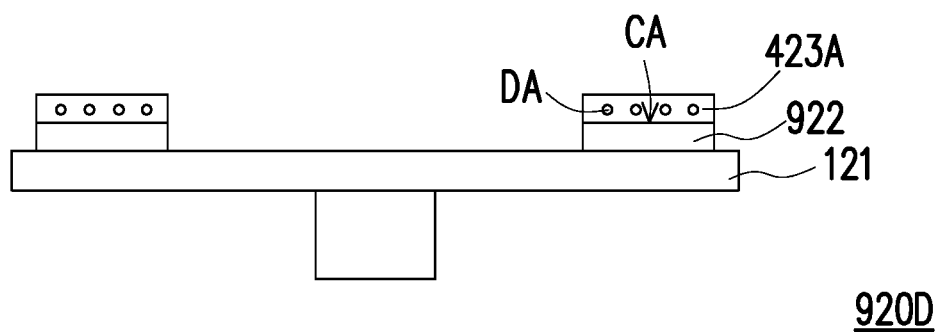
FIG. 9E is a cross-sectional view of the wavelength conversion module of FIG. 9D.

FIG. 9D is a top view of another wavelength conversion module of FIG. 9A. FIG. 9E is a cross-sectional view of the wavelength conversion module of FIG. 9D. The wavelength conversion module 920D of FIG. 9D is similar to the wavelength conversion module 520D of FIG. 5D, and differences there between are as follows. In the wavelength conversion module 920D of the embodiment, the annular diffusion layer 122 is replaced by a mirror reflection layer 922 to construct an annular mirror reflection layer. In this way, the wavelength conversion module 920D may still convert the first part of the excited beam 50 from one excitation light source 110 into the first color light 60Y through configuration of the dot-like microstructures DA in the annular wavelength conversion region OT, and the second part of the excited beam 50 forms the second color light 60B after passing through the cavities CA.

In the embodiment, since the wavelength conversion module 920D and the wavelength conversion module 520D of FIG. 5D have the similar structure, the wavelength conversion module 920D may achieve similar effects and advantages with that of the aforementioned wavelength conversion module 520D, and details thereof are not repeated. Moreover, when the wavelength conversion module 920D is applied to the aforementioned illumination system 900A and the projection apparatus 100, the illumination system 900A and the projection apparatus 100 may achieve the similar effects and advantages, and details thereof are not repeated.

Moreover, a wavelength conversion module of another embodiment is similar to the wavelength conversion module 920D of FIG. 9D, a difference there between is that the annular diffusion layer 122 is replaced by a mirror reflection layer. The wavelength conversion module further has an annular wavelength conversion region of a specific light absorbing condition, and in the embodiment, the wavelength conversion module having the annular wavelength conversion region of the specific light absorbing condition has the similar structure with that of the wavelength conversion module 520F of FIG. 5F, and when the wavelength conversion module having the annular wavelength conversion region of the specific light absorbing condition is applied to the aforementioned illumination system 900A and the projection apparatus 100, the illumination system 900A and the projection apparatus 100 may achieve the similar effects and advantages, and details thereof are not repeated.

Figure 10:
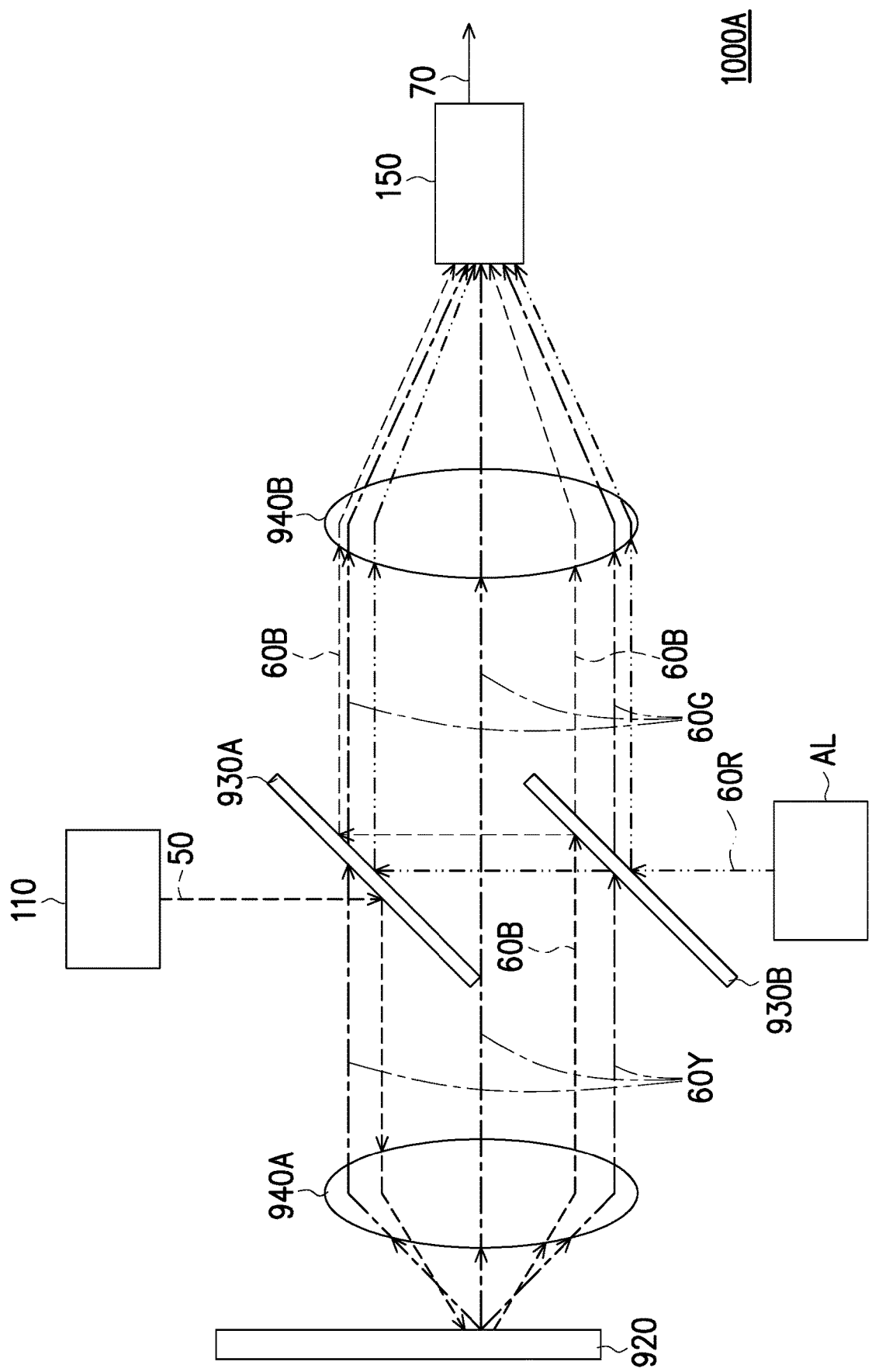
FIG. 10 to FIG. 11B are structural schematic diagrams of various illumination systems of FIG. 1A.

FIG. 10 is a structural schematic diagram of another illumination system of FIG. 1A. The illumination system 1000A of FIG. 10 is similar to the illumination system 900A of FIG. 9A, and differences there between are as follows. In the embodiment, the illumination system 1000A further includes an auxiliary light source AL. The auxiliary light source AL is configured to emit an auxiliary beam 60R, where a waveband of the auxiliary beam 60R is at least partially overlapped with a waveband of the first color light 60Y. In the embodiment, the auxiliary beam 60R is, for example, red light.

Moreover, in the embodiment, the fifth dichroic element 930A is, for example, a dichroic mirror (DMBR) having a blue light and red light reflection function. The sixth dichroic element 930B is a Blue & Red Half Mirror (BRHM), which is pervious to a part of the auxiliary beam 60R and second color light 60B, and reflects the other part of the auxiliary beam 60R and second color light 60B.

Moreover, as shown in FIG. 10, in the embodiment, the sixth dichroic element 930B is located on the transmission path of the auxiliary beam 60R. In this way, the sixth dichroic element 930B is pervious to a part of the auxiliary beam 60R for transmitting the same to the fifth dichroic element 930A, and reflects another part of the auxiliary beam 60R for transmitting the same to the second condensing lens group 940B. Moreover, as shown in FIG. 10, in the embodiment, the fifth dichroic element 930A reflects the excited beam 50, and reflects the second color light 60B and the auxiliary beam 60R from the sixth dichroic element 930B, and is pervious to the partial first color light 60G from the wavelength conversion module 920. In this way, the auxiliary beam 60R, the second color light 60B and the partial first color light 60G from the fifth dichroic element 930A and the sixth dichroic element 930B are combined by the second condensing lens group 940B to form the illumination beam 70.

In this way, by configuring the auxiliary light source AL in the illumination system 1000A, a proportion of the red light in the illumination beam 70 is increased, so as to improve the red color performance of the projected image. Moreover, in the embodiment, since the illumination system 1000A may also adopt the structure of the wavelength conversion module 920 (or the wavelength conversion modules 920D or the wavelength conversion module having the annular wavelength conversion region of the specific light absorbing condition) adopted by the aforementioned illumination system 900A, the illumination system 1000A may achieve effects and advantages similar to that of the illumination system 900A, and details thereof are not repeated. Moreover, when the illumination system 1000A is applied to the aforementioned projection apparatus 100, the projection apparatus 100 may also achieve the similar effects and advantages, and detail thereof is not repeated.

Figure 11A:
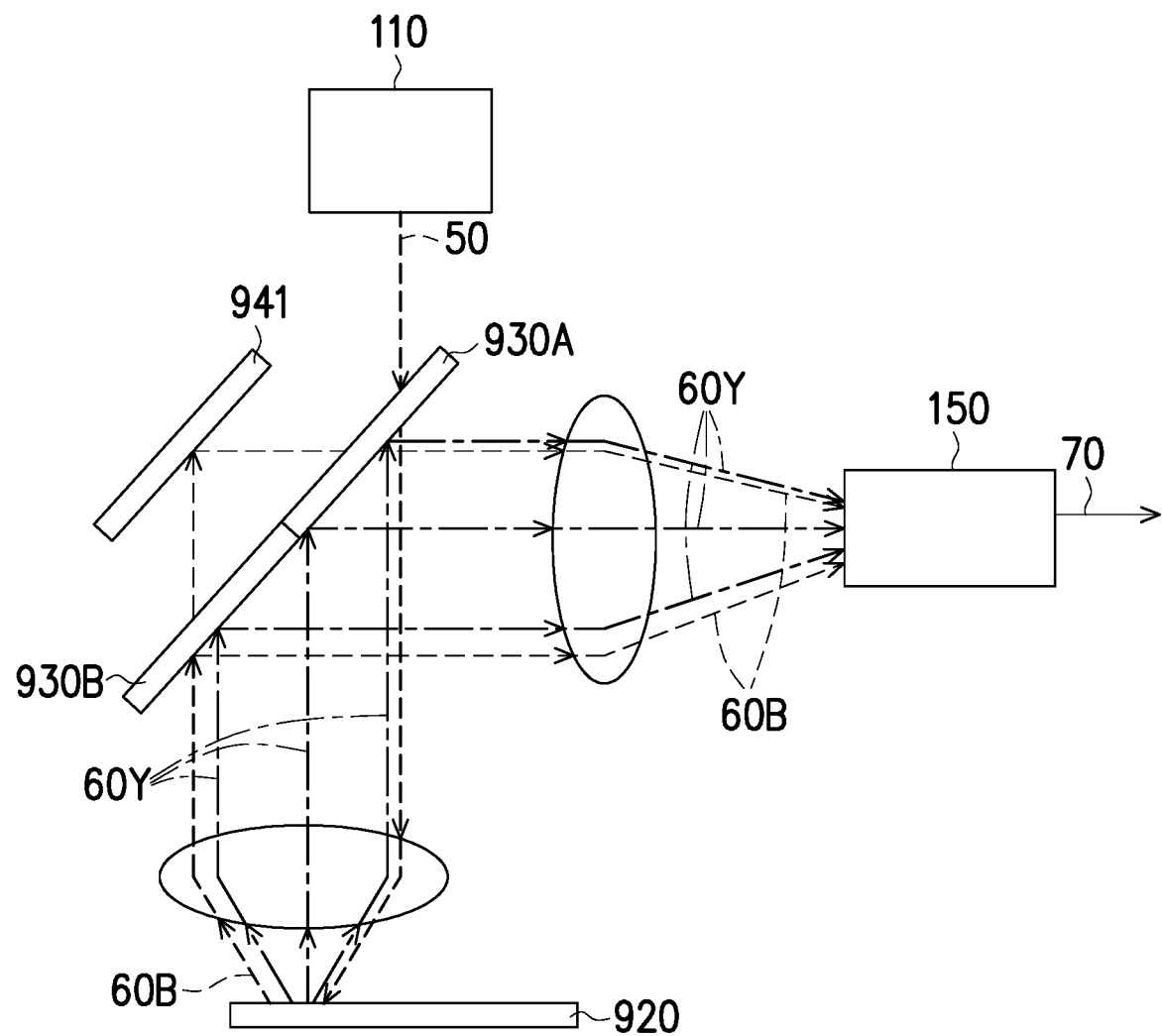

FIG. 11A is a structural schematic diagram of another illumination system of FIG. 1A. The illumination system 1100A of FIG. 11A is similar to the illumination system 900A of FIG. 9A, and differences there between are as follows. In the embodiment, the fifth dichroic element 930A is, for example, a dichroic mirror (DMY) with a yellow light reflection function, which is pervious to blue light, i.e. the fifth dichroic element 930A may reflect the first color light 60Y from the wavelength conversion module 920, and is pervious to the excited beam 50 and the second color light 60B from the wavelength conversion module 920. The sixth dichroic element 930B may have both of functions of a Blue Half Mirror (BHM) and a dichroic mirror (DMY) with a yellow light reflection effect. For example, the sixth dichroic element 930B may be respectively plated with different dichroic films on two opposite surfaces, where one surface thereof have the function of the BHM, and another surface have the function of the dichroic mirror with the yellow light reflection effect. In this way, the sixth dichroic element 930B may be pervious to a part of the second color light 60B from the wavelength conversion module 920 and reflects another part of the second color beam 60B, and reflects the first color light 60Y from the wavelength conversion module 920.

Moreover, as shown in FIG. 11A, in the embodiment, the illumination system 1100A further includes a light transmission module 941. The light transmission module 941 is located on the transmission path of the second color light 60B. For example, in the embodiment, the light transmission module 941 may be a reflecting element, and is adapted to reflect the second color light 60B. Therefore, a part of the second color light 60B from the sixth dichroic element 930B may be sequentially transmitted to the fifth dichroic element 930A and the second condensing lens group 940B by the light transmission module 941. Then, as shown in FIG. 11A, in the embodiment, the first color light 60Y and the second color light 60B from the fifth dichroic element 930A and the sixth dichroic element 930B may be transmitted to the light uniforming element 150 after passing through the second condensing lens group 940B, and are combined to form the illumination beam 70.

In the embodiment, since the illumination system 1100A may also adopt the structure of the wavelength conversion module 920 (or the wavelength conversion module 920D, or the wavelength conversion module having the annular wavelength conversion region of the specific light absorbing condition) adopted by the aforementioned illumination system 900A, the illumination system 1100A may achieve effects and advantages similar to that of the illumination system 900A, and details thereof are not repeated. Moreover, when the illumination system 1100A is applied to the aforementioned projection apparatus 100, the projection apparatus 100 may also achieve the similar effects and advantages, and detail thereof is not repeated.

Figure 11B:
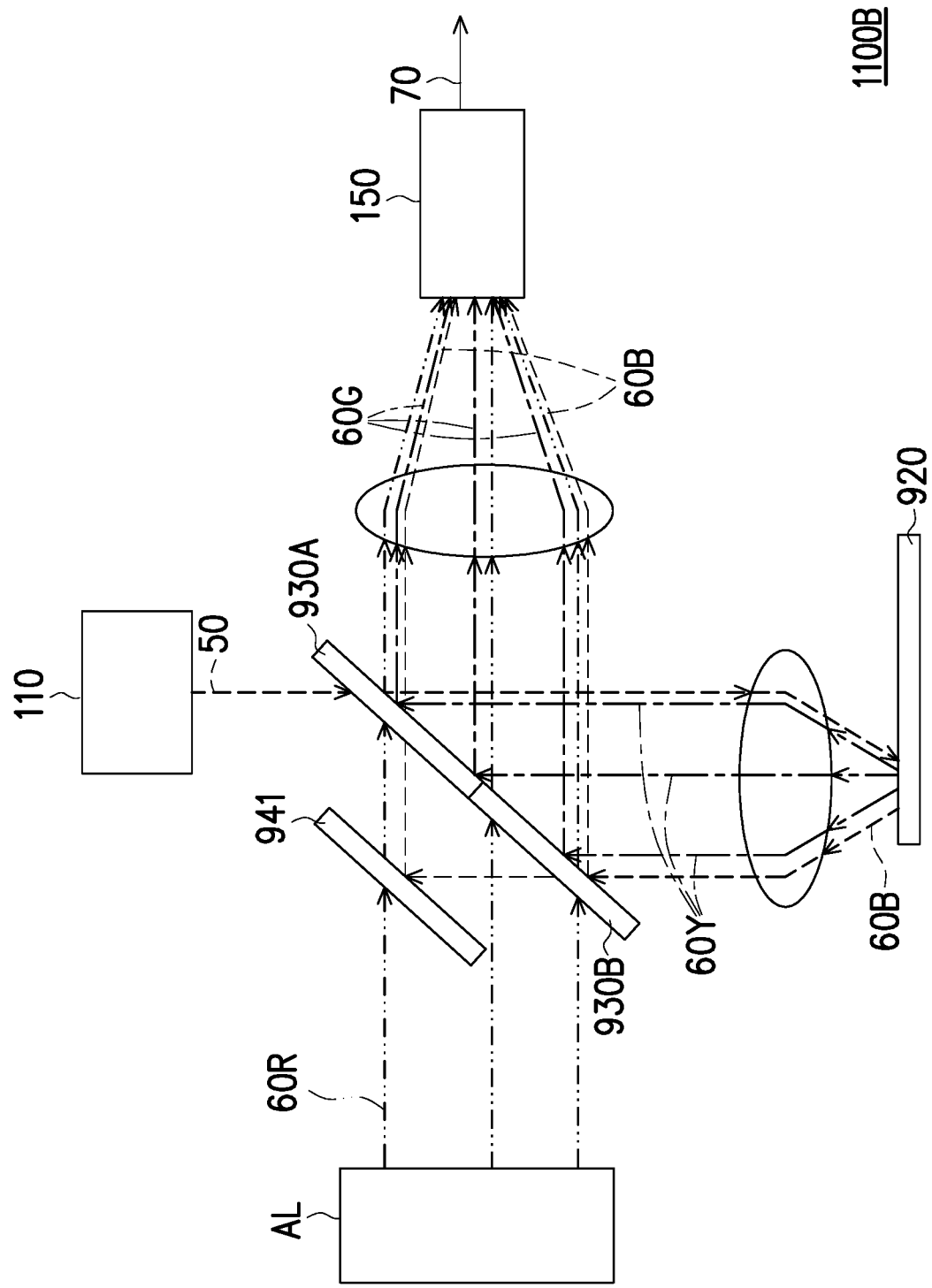

FIG. 11B is a structural schematic diagram of another illumination system of FIG. 1A. The illumination system 1100B of FIG. 11B is similar to the illumination system 1100A of FIG. 11A, and differences there between are as follows. In the embodiment, the illumination system 1100B further includes an auxiliary light source AL. The auxiliary light source AL is configured to emit an auxiliary beam 60R, where a waveband of the auxiliary beam 60R is at least partially overlapped with a waveband of the first color light 60Y. In the embodiment, the auxiliary beam 60R is, for example, red light.

Moreover, as shown in FIG. 11B, in the embodiment, the fifth dichroic element 930A and the sixth dichroic element 930B are located on the transmission path of the auxiliary beam 60R. To be specific, in the embodiment, the fifth dichroic element 930A is, for example, a dichroic mirror (DMGO) having a green orange light reflection function, which is pervious to blue light, and is adapted to reflect the partial first color light 60G from the wavelength conversion module 920, and is pervious to the excited beam 50 and the second color light 60B from the wavelength conversion module 920 and the auxiliary beam 60R from the auxiliary light source AL. The sixth dichroic element 930B may have both of functions of a Blue Half Mirror (BHM) and a dichroic mirror (DMY) with a green orange light reflection effect. For example, the sixth dichroic element 930B may be respectively plated with different dichroic films on two opposite surfaces thereof, where one surface thereof have the function of the BHM, and another surface have the function of the dichroic mirror with the green orange light reflection effect. In this way, the sixth dichroic element 930B may be pervious to a part of the second color light 60B from the wavelength conversion module 920 and the auxiliary beam 60R from the auxiliary light source AL, and reflects another part of the second color beam 60B, and reflects the partial first color light 60G from the wavelength conversion module 920.

On the other hand, the light transmission module 941 is, for example, a dichroic mirror (DMB) with the blue light reflection function, which is pervious to the auxiliary beam 60R and reflects the second color light 60B. Therefore, as shown in FIG. 11B, in the embodiment, the auxiliary beam 60R may penetrate through the light transmission module 941 for being transmitted to the fifth dichroic element 930A and the sixth dichroic element 930B, and then penetrate through the fifth dichroic element 930A and the sixth dichroic element 930B. Then, as shown in FIG. 11B, in the embodiment, the auxiliary beam 60R, the second color light 60B and the partial first color light 60G from the fifth dichroic element 930A and the sixth dichroic element 930B are transmitted to the light uniforming element 150 after passing through the second condensing lens group 940B, and are combined to form the illumination beam 70.

In this way, by configuring the auxiliary light source AL in the illumination system 1100B, a proportion of the red light in the illumination beam 70 is increased, so as to improve the red color performance of the projected image. Moreover, in the embodiment, since the illumination system 1100B may also adopt the structure of the wavelength conversion module 920 (or the wavelength conversion module 920D, or the wavelength conversion module having the annular wavelength conversion region of the specific light absorbing condition) adopted by the aforementioned illumination system 1100A, the illumination system 1100B may achieve effects and advantages similar to that of the illumination system 1100A, and details thereof are not repeated. Moreover, when the illumination system 1100B is applied to the aforementioned projection apparatus 100, the projection apparatus 100 may also achieve the similar effects and advantages, and detail thereof is not repeated.

Figure 12:
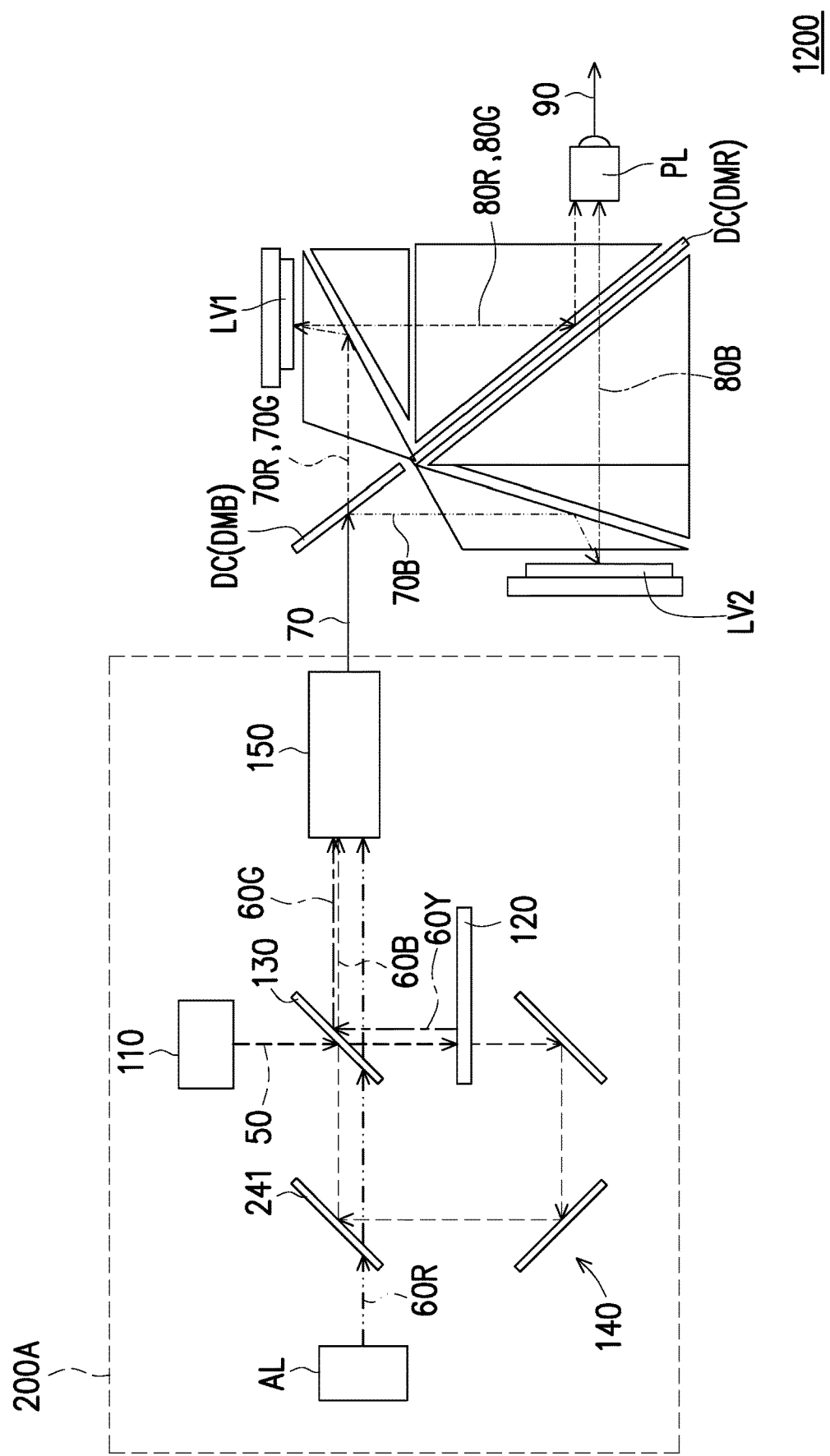
FIG. 12 is a structural schematic diagram of another projection apparatus according to an embodiment of the invention.

FIG. 12 is a structural schematic diagram of another projection apparatus according to an embodiment of the invention. The projection apparatus 1200 of FIG. 12 is similar to the projection apparatus 100 of FIG. 1A, and differences there between are as follows. In the embodiment, the number of the light valves LV is two, (for example, light valves LV1, LV2), and the projection apparatus 1200 adopts the aforementioned illumination system 200A of the embodiment of FIG. 2A.

To be specific, as shown in FIG. 12, in the embodiment, the excitation light source 110 and the auxiliary light source AL are not simultaneously turned on, and sequentially form different colors of the auxiliary beam 60R, the second color light 60B and the first color light 60Y (or the partial first color light 60G). Then, as shown in FIG. 12, in the embodiment, the light splitting/combining unit DC is located on the transmission path of the illumination beam 70, and is adapted to convert the illumination beam 70 into a plurality of sub-illumination beams 70R, 70G, 70B. For example, as shown in FIG. 12, the light splitting/combining unit DC may include the dichroic mirror DMB with the blue light reflection function and the dichroic mirror DMR with the red light reflection function. In this way, when the excitation light source 110 is turned on, and when the illumination beam 70 having the second color light 60B and the partial first color light 60G passes through the dichroic mirror DMB, the illumination beam 70 is sequentially split into the sub-illumination beams 70B and 70G, and the sub-illumination beams 70B and 70G are transmitted to the subsequent light valves LV1 and LV2. Then, the light valves LV1 and LV2 convert the corresponding sub-illumination beams 70G and 70B into a plurality of image beams 80G and 80B.

On the other hand, when the auxiliary light source AL is turned on, the auxiliary beam 60R penetrates through the dichroic mirror DMB of the light splitting/combining unit DC to form the sub-illumination beam 70R, and the sub-illumination beam 70R is transmitted to the subsequent light valve LV1. Then, the light valve LV1 converts the sub-illumination beam 70R into a corresponding image beam 80R, and the image beams 80R, 80G, 80B are combined by the dichroic mirror DMR of the light splitting/combining unit DC and are transmitted to the projection lens PL. Moreover, the projection lens PL is located on the transmission path of the image beams 80R, 80G and 80B, and is used for converting the image beams 80R, 80G and 80B into a projection beam 90, and the projection beam 90 is projected to a screen (not shown). In this way, the projected image becomes a color image.

In the embodiment, the projection apparatus 1200 also adopts the aforementioned illumination system 200A and the structure of the wavelength conversion module 120 adopted by the illumination system 200A, so that the projection apparatus 1200 may achieve effects and advantages similar with that of the aforementioned projection apparatus 100, and details thereof are not repeated. Moreover, the aforementioned illumination systems 200B, 200C, 300B, 300C, 600A, 600B, 600C, 700A, 800A, 1000A, 1100B having the auxiliary light source AL may also replace the illumination system 200A of the embodiment for being applied to the projection apparatus 1200, and the projection apparatus 1200 may achieve the similar effects and advantages, and details thereof are not repeated.

In summary, the embodiments of the invention have at least one of following advantages or effects. In the embodiments of the invention, the illumination system and the projection apparatus convert a part of the excited beam from one excitation light source into the first color light, and convert another part of the excited beam into the second color light based on configuration of the annular wavelength conversion region of the wavelength conversion module. In this way, the illumination system and the projection apparatus may form three colors (blue, green and red) of light in case that only one excitation light source is configured, so as to achieve a simple structure and a concise optical path layout. Moreover, since the optical path layout of the illumination system and the projection apparatus is effectively simplified, layout flexibility of other components in the system is increased. Moreover, since the illumination system and the projection apparatus are only required to configure one excitation light source, light source energy may be concentrated to one place, and design complexity of a cooling module is decreased, which avails enhancing design flexibility of a system layout. Moreover, by configuring the auxiliary light source in the illumination system and the projection apparatus, a proportion of the red light in the illumination beam is increased, so as to improve the red color performance of the projected image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illumination system, configured to provide an illumination beam, the illumination system comprising: an excitation light source and a wavelength conversion module, wherein, the excitation light source is configured to emit an excited beam;

the wavelength conversion module is located on a transmission path of the excited beam, and having an annular wavelength conversion region, wherein when the excited beam is transmitted to the wavelength conversion module, the excited beam forms a light spot on the wavelength conversion module, at least part of the light spot is located on the annular wavelength conversion region, and a first part of the excited beam is incident to the annular wavelength conversion region and converted into a first color light, and a second part of the excited beam is incident to the wavelength conversion module to form a second color light, wherein the first color light and the second color light are simultaneously emitted out of the wavelength conversion module, and the illumination beam comprises the first color light and the second color light, and a proportional value range of the second part of the excited beam and the excited beam ranges between 5% and 30%, wherein colors of the second color light and the excited beam are the same;
a first dichroic element, located between the excitation light source and the wavelength conversion module, wherein the excited beam of the excitation light source is transmitted to the wavelength conversion module through the first dichroic element, and the wavelength conversion module reflects the first color light to the first dichroic element; and
a light transmission module, located on a transmission path of the second color light, and configured to transmit the second color light emitted from the wavelength conversion module to the first dichroic element.

2. The illumination system of claim 1, wherein the wavelength conversion module comprises:
a substrate; and
an annular wavelength conversion layer, located on the substrate, and disposed corresponding to the annular wavelength conversion region.

3. The illumination system of claim 2, wherein the wavelength conversion module further has a non-conversion region, wherein at least part of the light spot is located on the non-conversion region, and the second part of the excited beam is incident to the non-conversion region to form the second color light.

4. The illumination system of claim 3, wherein the wavelength conversion module comprises a first annular diffusion region and a second annular diffusion region, the first annular diffusion region and the second annular diffusion region are located on the substrate and correspond to the non-conversion region, wherein the annular wavelength conversion region is located between the first annular diffusion region and the second annular diffusion region, and the annular wavelength conversion layer surrounds the first annular diffusion region, and is surrounded by the second annular diffusion region.

5. The illumination system of claim 2, wherein when the annular wavelength conversion layer satisfies a light absorbing condition, the second part of the excited beam forms the second color light after passing through the annular wavelength conversion layer, the light absorbing condition is that a volume concentration of a wavelength conversion material in the annular wavelength conversion layer ranges between 30% and 85%, or a thickness of the annular wavelength conversion layer ranges between 0.03 mm and 0.3 mm.

6. The illumination system of claim 2, wherein the wavelength conversion module further comprises a first annular reflection region and a second annular reflection region, the first annular reflection region and the second annular reflection region are located on the substrate and correspond to a non-conversion region of the wavelength conversion module, wherein the annular wavelength conversion layer is located between the first annular reflection region and the second annular reflection region, and the annular wavelength conversion layer surrounds the first annular reflection region, and is surrounded by the second annular reflection region.

7. The illumination system of claim 2, wherein an outer diameter edge of the annular wavelength conversion layer is aligned with an outer diameter edge of the substrate.

8. The illumination system of claim 1, further comprising:
an auxiliary light source, configured to emit an auxiliary beam, and a waveband of the auxiliary beam being at least partially overlapped with a waveband of the first color light, wherein a second dichroic element is located on a transmission path of the second color light and the auxiliary beam, and the auxiliary beam, the first color light and the second color light are combined to form the illumination beam after passing through the first dichroic element and the second dichroic element.

9. The illumination system of claim 1, wherein the wavelength conversion module comprises:
a substrate;
an annular wavelength conversion layer, located on the substrate, and disposed corresponding to the annular wavelength conversion region; and
a reflection layer, disposed between the annular wavelength conversion layer and the substrate.

10. A projection apparatus, comprising:
the illumination system of claim 1;
a light splitting/combining unit, located on a transmission path of the illumination beam, and configured to convert the illumination beam into a plurality of sub-illumination beams;
at least two light valves, located on a transmission path of the sub-illumination beams, and configured to convert the sub-illumination beams into a plurality of image beams; and
a projection lens, located on a transmission path of the image beams, and configured to convert the image beams into a projection beam, wherein the image beams are transmitted to the projection lens by the light splitting/combining unit.

11. An illumination system, configured to provide an illumination beam, the illumination system comprising:
an excitation light source, wherein the excitation light source is configured to emit an excited beam; and
a wavelength conversion module, wherein the wavelength conversion module is located on a transmission path of the excited beam, and having an annular wavelength conversion region and a non-conversion region, wherein the wavelength conversion module comprises:
a substrate; and
an annular wavelength conversion layer, located on the substrate, and disposed corresponding to the annular wavelength conversion region, wherein when the excited beam is transmitted to the wavelength conversion module, the excited beam forms a light spot on the wavelength conversion module, at least part of the light spot is located on the annular wavelength conversion region, and a first part of the excited beam is incident to the annular wavelength conversion region and converted into a first color light, and a second part of the excited beam is incident to the wavelength conversion module to form a second color light, wherein the first color light and the second color light are simultaneously emitted out of the wavelength conversion module, and the illumination beam comprises the first color light and the second color light, and a proportional value range of the second part of the excited beam and the excited beam ranges between 5% and 30%, wherein at least part of the light spot is located on the non-conversion region, and the second part of the excited beam is incident to the non-conversion region to form the second color light,
wherein the annular wavelength conversion layer has a plurality of dot-like microstructures, the dot-like microstructures are made of a wavelength conversion material, the dot-like microstructures have cavities there between without configuring the wavelength conversion material, and the cavities correspond to the non-conversion region, wherein the second part of the excited beam forms the second color light after passing through the non-conversion region of the wavelength conversion module.

12. An illumination system, configured to provide an illumination beam, the illumination system comprising:
   an excitation light source, wherein the excitation light source is configured to emit an excited beam;
   a wavelength conversion module, wherein the wavelength conversion module is located on a transmission path of the excited beam, and having an annular wavelength conversion region, wherein the wavelength conversion module comprises:
      a substrate, wherein the substrate is a reflection substrate; and
      an annular wavelength conversion layer, located on the substrate, and disposed corresponding to the annular wavelength conversion region, wherein when the excited beam is transmitted to the wavelength conversion module, the excited beam forms a light spot on the wavelength conversion module, at least part of the light spot is located on the annular wavelength conversion region, and a first part of the excited beam is incident to the annular wavelength conversion region and converted into a first color light, and a second part of the excited beam is incident to the wavelength conversion module to form a second color light, wherein the first color light and the second color light are simultaneously emitted out of the wavelength conversion module, and the illumination beam comprises the first color light and the second color light, and a proportional value range of the second part of the excited beam and the excited beam ranges between 5% and 30%, wherein colors of the second color light and the excited beam are the same;
   a fourth dichroic element, located between the excitation light source and the wavelength conversion module, wherein the fourth dichroic element has a first region and a second region, and the second region surrounds the first region; and
   an auxiliary light source, configured to emit an auxiliary beam, and a waveband of the auxiliary beam being at least partially overlapped with a waveband of the first color light, wherein the auxiliary beam, the first color light and the second color light are combined to form the illumination beam after passing through the fourth dichroic element.

13. The illumination system of claim 12, wherein the first region of the fourth dichroic element is pervious to the excited beam and reflects the first color light, and the second region is adapted to reflect the first color light and the second color light from the wavelength conversion module.

14. The illumination system of claim 12, wherein the first region of the fourth dichroic element is adapted to reflect the excited beam and is pervious to the first color light, and the second region is pervious to the first color light and the second color light from the wavelength conversion module.

15. An illumination system, configured to provide an illumination beam, the illumination system comprising:
   an excitation light source, wherein the excitation light source is configured to emit an excited beam;
   a wavelength conversion module, wherein the wavelength conversion module is located on a transmission path of the excited beam, and having an annular wavelength conversion region and a non-conversion region, wherein the wavelength conversion module comprises:
      a substrate, wherein the substrate is a reflection substrate; and
      an annular wavelength conversion layer, located on the substrate, and disposed corresponding to the annular wavelength conversion region; and
      a first annular reflection region and a second annular reflection region, the first annular reflection region and the second annular reflection region are located on the substrate and correspond to the non-conversion region, wherein the annular wavelength conversion layer is located between the first annular reflection region and the second annular reflection region, and the annular wavelength conversion layer surrounds the first annular reflection region, and is surrounded by the second annular reflection region, wherein when the excited beam is transmitted to the wavelength conversion module, the excited beam forms a light spot on the wavelength conversion module, at least part of the light spot is located on the annular wavelength conversion region, and a first part of the excited beam is incident to the annular wavelength conversion region and converted into a first color light, and a second part of the excited beam is incident to the wavelength conversion module to form a second color light, wherein the first color light and the second color light are simultaneously emitted out of the wavelength conversion module, and the illumination beam comprises the first color light and the second color light, and a proportional value range of the second part of the excited beam and the excited beam ranges between 5% and 30%, wherein colors of the second color light and the excited beam are the same, and the illumination system further comprises: a fifth dichroic element, a sixth dichroic element, a first condensing lens group and a second condensing lens group, wherein
   the fifth dichroic element is located between the excitation light source and the wavelength conversion module;
   the first condensing lens group is located between the fifth dichroic element, the sixth dichroic element and the wavelength conversion module, the sixth dichroic element is pervious to a part of the second color light, and reflects another part of the second color light, wherein
   the excited beam from the excitation light source is guided to the first condensing lens group by the fifth dichroic element, and is obliquely incident to the wavelength conversion module through the first condensing lens group to form the first color light and the second color light;
   the first color light from the wavelength conversion module is obliquely incident to the first condensing lens group, and is transmitted to the second condensing lens group after passing through the fifth dichroic element and the sixth dichroic element;
   the second color light from the wavelength conversion module is obliquely incident to the first condensing lens group; and after passing through the sixth dichroic element, a part of the second color light is transmitted to the fifth dichroic element and is then transmitted to the second condensing lens group, and another part of the second color light is transmitted to the second condensing lens group;

the second condensing lens group is configured to converge the second color light and the first color light from the fifth dichroic element and the sixth dichroic element.

16. The illumination system of claim 15, further comprising:

a light transmission module, located on a transmission path of the second color light, wherein the part of the second color light from the sixth dichroic element is sequentially transmitted to the fifth dichroic element and the second condensing lens group through the light transmission module.

17. The illumination system of claim 16, further comprising:

an auxiliary light source, configured to emit an auxiliary beam, and a waveband of the auxiliary beam being at least partially overlapped with a waveband of the first color light, wherein the fifth dichroic element and the sixth dichroic element are located on the transmission path of the auxiliary beam and are pervious to the auxiliary beam, the fifth dichroic element is pervious to the excited beam, the second color light and the auxiliary beam and reflects the first color light, and the light transmission module is pervious to the auxiliary beam and reflects the second color light, wherein the auxiliary beam, the second color light and the first color light from the fifth dichroic element and the sixth dichroic element are combined to form the illumination beam after passing through the second condensing lens group.

18. The illumination system of claim 15, further comprising:

an auxiliary light source, configured to emit an auxiliary beam, and a waveband of the auxiliary beam being at least partially overlapped with a waveband of the first color light, wherein the fifth dichroic element is adapted to reflect the excited beam, the second color light and the auxiliary beam and is pervious to the first color light, the sixth dichroic element is located on a transmission path of the auxiliary beam, and the sixth dichroic element is pervious to a part of the auxiliary beam and reflects another part of the auxiliary beam, wherein the auxiliary beam, the second color light and the first color light from the fifth dichroic element and the sixth dichroic element are combined to form the illumination beam after passing through the second condensing lens group.

* * * * *